ID

(12) United States Patent
Goodchild et al.

(10) Patent No.: US 11,336,129 B2
(45) Date of Patent: *May 17, 2022

(54) ADAPTIVE PASSIVE PING

(71) Applicant: AIRA, INC., Chandler, AZ (US)

(72) Inventors: Eric Heindel Goodchild, Phoenix, AZ (US); John Winters, San Diego, CA (US)

(73) Assignee: AIRA, INC., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/368,770

(22) Filed: Jul. 6, 2021

(65) Prior Publication Data
US 2021/0351634 A1    Nov. 11, 2021

Related U.S. Application Data

(63) Continuation of application No. 16/885,236, filed on May 27, 2020, now Pat. No. 11,063,480.

(60) Provisional application No. 62/901,256, filed on Sep. 16, 2019, provisional application No. 62/856,933, (Continued)

(51) Int. Cl.
*H02J 50/90* (2016.01)
*H02J 50/40* (2016.01)
*H02J 50/12* (2016.01)
*H02J 50/80* (2016.01)
*H02J 50/10* (2016.01)
*H02J 7/00* (2006.01)
(Continued)

(52) U.S. Cl.
CPC .......... *H02J 50/90* (2016.02); *H02J 7/00034* (2020.01); *H02J 50/10* (2016.02); *H02J 50/12* (2016.02); *H02J 50/40* (2016.02); *H02J 50/80* (2016.02); *H04B 5/0037* (2013.01); *H04B 5/0075* (2013.01); *H04L 27/06* (2013.01)

(58) Field of Classification Search
CPC . H02J 50/00; H02J 50/80; H02J 50/90; H04B 5/00
See application file for complete search history.

(56) References Cited

U.S. PATENT DOCUMENTS 7,952,322 B2    5/2011   Partovi et al.
8,207,707 B2    6/2012   Hart et al.
9,482,702 B2   11/2016   Komiyama
(Continued)

OTHER PUBLICATIONS

International Search Report and Written Opinion for International Application No. PCT/US20/34985, dated Sep. 9, 2020, 12 pages.

*Primary Examiner* — Adi Amrany
(74) *Attorney, Agent, or Firm* — Loza & Loza, LLP; Anthony Smyth

(57) ABSTRACT

Systems, methods and apparatus for wireless charging are disclosed. A charging device has a charging circuit that includes a charging coil located proximate to a surface of the charging device, a pulse generating circuit, and a controller. The pulse generating circuit may be configured to provide a pulsed signal to the charging circuit, where each pulse in the pulsed signal includes a plurality of cycles of a clock signal that has a frequency greater or less than a nominal resonant frequency of the charging circuit. The controller may be configured to detect a change in resonance of the charging circuit based on a difference in response of the charging circuit to first and second pulses transmitted in the pulsed signal. The controller may be further configured to determine that a chargeable device has been placed in proximity to the charging coil based on the difference in responses.

20 Claims, 14 Drawing Sheets

Related U.S. Application Data filed on Jun. 4, 2019, provisional application No. 62/853,708, filed on May 28, 2019.

(51) Int. Cl.
  *H04B 5/00*  (2006.01)
  *H04L 27/06*  (2006.01)

(56) References Cited

U.S. PATENT DOCUMENTS

| | | |
|---|---|---|
| 9,939,539 B2 | 4/2018 | Oettinger |
| 2015/0285926 A1 | 10/2015 | Oettinger |
| 2016/0248279 A1 | 8/2016 | Nakano et al. |
| 2016/0268842 A1 | 9/2016 | Wang et al. |
| 2016/0372956 A1 | 12/2016 | Jung et al. |
| 2017/0093222 A1 | 3/2017 | Joye et al. |
| 2018/0109152 A1 | 4/2018 | Chen |
| 2018/0219431 A1 | 8/2018 | Guillermo et al. |
| 2018/0337557 A1 | 11/2018 | Chen et al. |
| 2019/0267828 A1 | 8/2019 | Goodchild et al. |
| 2019/0393731 A1 | 12/2019 | Maniktala |

… # ADAPTIVE PASSIVE PING

PRIORITY CLAIM

This is a continuation of U.S. patent application Ser. No. 16/885,236 filed May 27, 2020, which claims priority to and the benefit of U.S. Provisional Application Ser. No. 62/853,708 filed May 28, 2019; U.S. Provisional Application Ser. No. 62/856,933 filed Jun. 4, 2019; and U.S. Provisional Application Ser. No. 62/901,256 filed Sep. 16, 2019, the entire contents of which applications are incorporated herein by reference as if fully set forth below in their entirety and for all applicable purposes.

TECHNICAL FIELD

The present invention relates generally to wireless charging of batteries, including batteries in mobile computing devices and more particularly to locating devices to be charged.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Conventional wireless charging systems typically use a "Ping" to determine if a receiving device is present on or proximate to a transmitting coil in a base station for wireless charging. The transmitter coil has an inductance (L) and, a resonant capacitor that has a capacitance (C) is coupled to the transmitting coil to obtain a resonant LC circuit. A Ping is produced by delivering power to the resonant LC circuit. Power is applied for a duration of time (90 ms in one example) while the transmitter listens for a response from a receiving device. The response may be provided in a signal encoded using Amplitude Shift Key (ASK) modulation. This conventional Ping-based approach can be slow due to the 90 ms duration, and can dissipate large and significant amounts of energy, which may amount to 80 mJ per Ping. In one example, a typical transmitting base station may ping as fast as 12.5 times a second (period=1/80 ms) with a power consumption of (80 mJ*12.5) per second=1 W. In practice most, designs trade off responsiveness for a lower quiescent power draw by lowering the ping rate. As an example, a transmitter may ping 5 times a second with a resultant power draw of 400 mW.

Tradeoffs are generally possible for base stations that employ a single transmitting coil, because a ping rate of 5 times a second is usually sufficient to detect a device within 1 second of its placement on a charging pad. However, for a multi-coil free position charging pad, responsiveness and quiescent power draw characteristics may be impaired. For example, 35 pings per second would be required to produce 5 pings per second on each transmitting coil of a 7-coil, free position charging pad scanning. Given the power limits defined by design specifications, the 7-coil free position charging pad has a response rate that is greater than 1.78 seconds, which is typically unacceptable for user experience and may violate regulatory power standards or power budgets for battery powered designs.

Improvements in wireless charging capabilities are required to support continually increasing complexity of mobile devices and changing form factors. For example, there is a need for a faster, lower power detection techniques.

DETAILED DESCRIPTION

Figure 1:
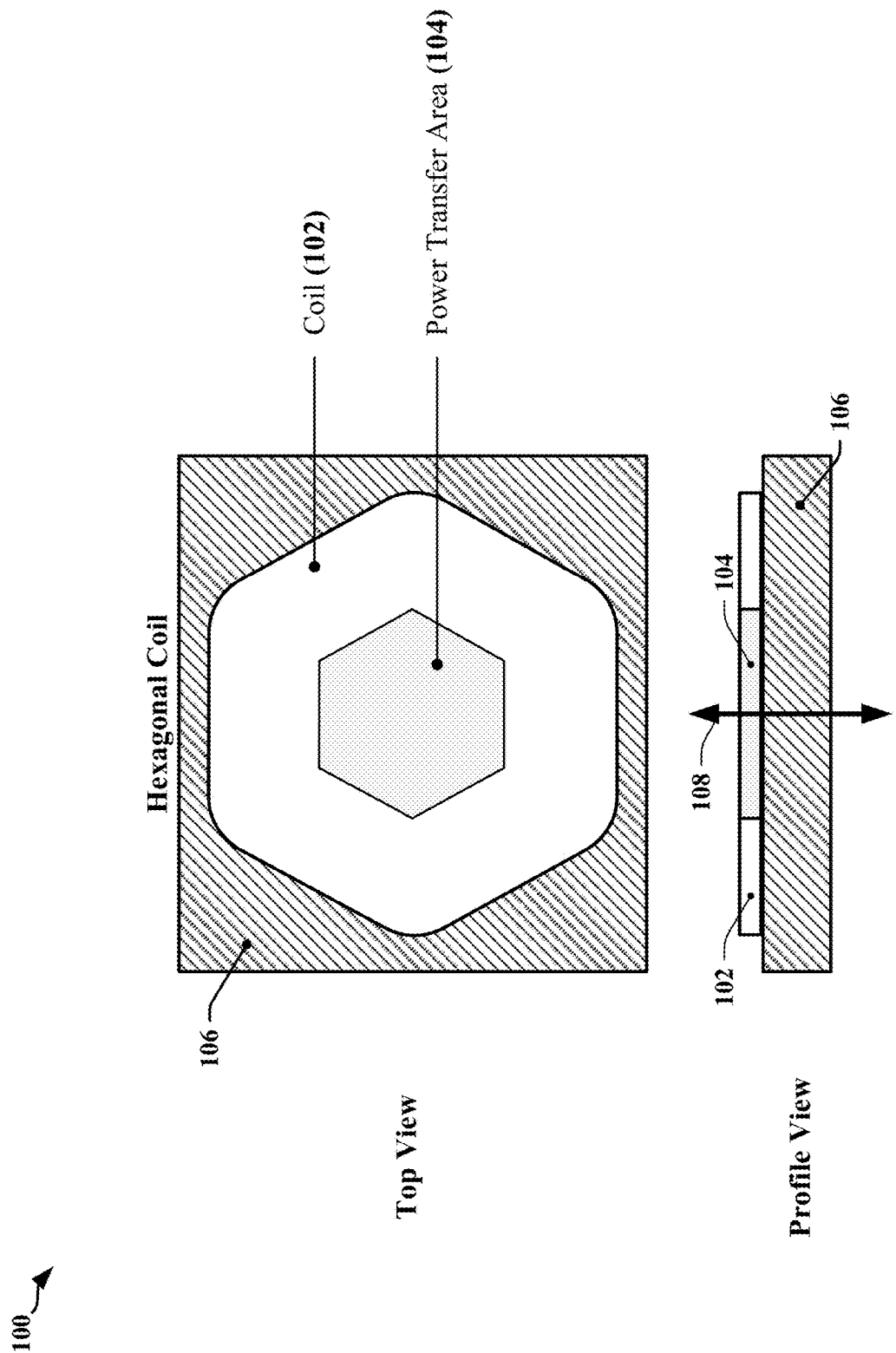
FIG. 1 illustrates an example of a charging cell that may be employed to provide a charging surface in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices and techniques. Charging cells may be configured with one or more inductive coils to provide a charging surface that can charge one or more devices wirelessly. The location of a device to be charged may be detected through sensing techniques that associate location of a device to changes in a physical characteristic centered at a known location on the charging surface. Sensing of location may be implemented using capacitive, resistive, inductive, touch, pressure, load, strain, and/or another appropriate type of sensing.

One aspect of the present disclosure relates to systems, apparatus and methods that enable fast, low-power detection of objects placed in proximity to a charging surface. In one example, an object may be detected when a pulse provided to a charging circuit stimulates an oscillation in the charging circuit, or in some portion thereof. A frequency of oscillation of the charging circuit responsive to the pulse or a rate of decay of the oscillation of the charging circuit may be indicative or determinative of presence of a chargeable device has been placed in proximity to a coil of the charging circuit. Identification of a type or nature of the object may be made based on changes in a characteristic of the charging circuit. The pulse provided to the charging circuit may have a duration that is less than half the period of a nominal resonant frequency of the charging circuit.

In one aspect of the disclosure, an apparatus for detecting objects near a charging surface has a resonant circuit that includes a charging coil attached to the charging surface, a circuit configured to provide a measurement signal representative of the quality factor of the resonant circuit based on a measured response of the resonant circuit to a passive ping, a filter configured to provide a filtered version of the measurement signal that changes at a slower rate than the measurement signal, and comparison logic configured to generate a detection signal that switches when a difference between the measurement signal and the filtered version of the measurement signal exceeds a threshold level. The detection signal may indicate whether an object is positioned proximate to the charging coil.

Charging Cells

According to certain aspects disclosed herein, a charging surface may be provided using charging cells that are deployed adjacent to the charging surface. In one example the charging cells are deployed in accordance with a honeycomb packaging configuration. A charging cell may be implemented using one or more coils that can each induce a magnetic field along an axis that is substantially orthogonal to the charging surface adjacent to the coil. In this description, a charging cell may refer to an element having one or more coils where each coil is configured to produce an electromagnetic field that is additive with respect to the fields produced by other coils in the charging cell, and directed along or proximate to a common axis.

In some implementations, a charging cell includes coils that are stacked along a common axis and/or that overlap such that they contribute to an induced magnetic field substantially orthogonal to the charging surface. In some implementations, a charging cell includes coils that are arranged within a defined portion of the charging surface and that contribute to an induced magnetic field within the substantially orthogonal to portion of the charging surface associated with the charging cell. In some implementations, charging cells may be configurable by providing an activating current to coils that are included in a dynamically-defined charging cell. For example, a charging device may include multiple stacks of coils deployed across a charging surface, and the charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils.

FIG. 1 illustrates an example of a charging cell 100 that may be deployed and/or configured to provide a charging surface. In this example, the charging cell 100 has a substantially hexagonal shape that encloses one or more coils 102 constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations may provide coils 102 that have other shapes. The shape of the coils 102 may be determined at least in part by the capabilities or limitations of fabrication technology, and/or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
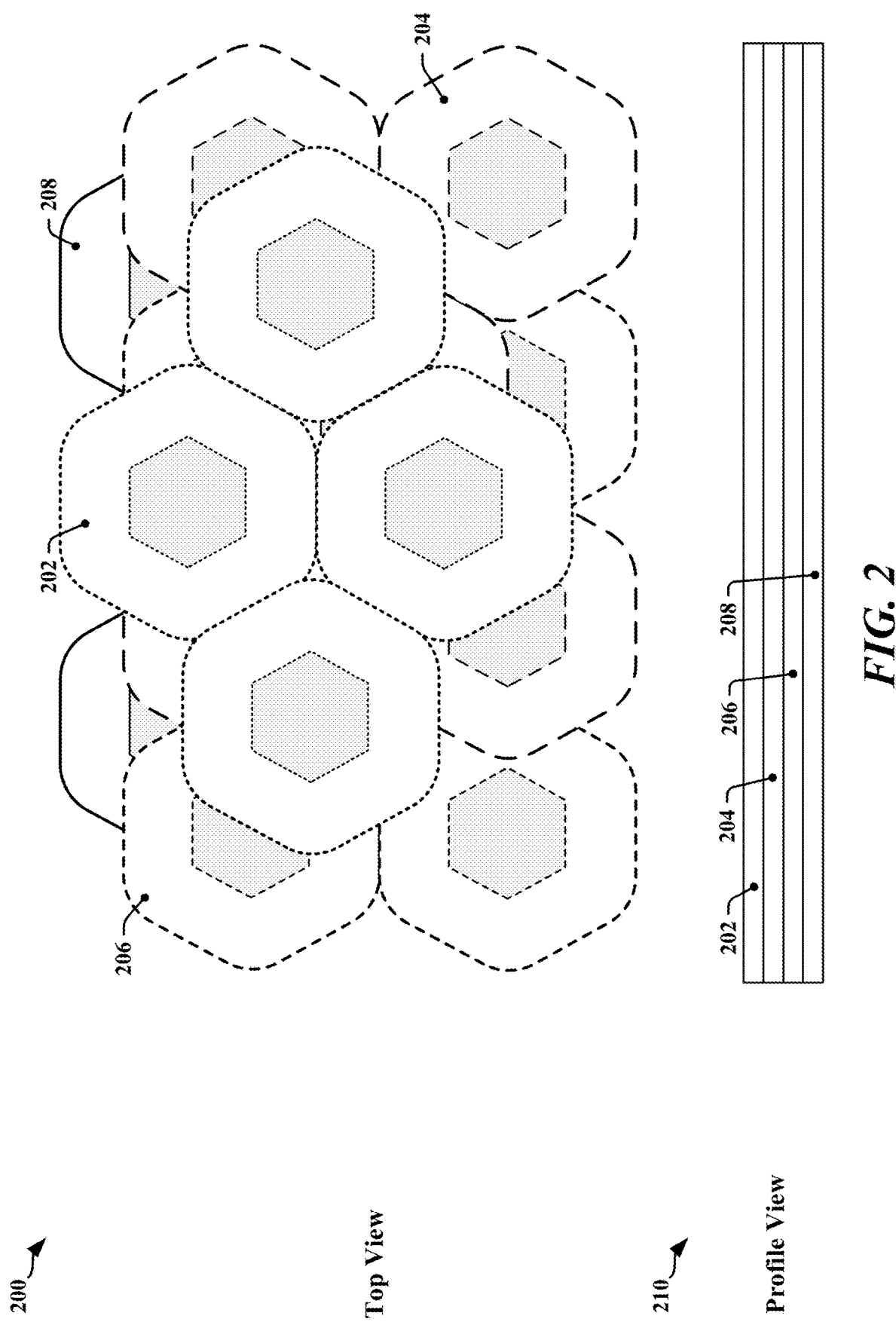
FIG. 2 illustrates an example of an arrangement of charging cells when multiple layers are overlaid within a segment of a charging surface that may be adapted in accordance with certain aspects disclosed herein.

FIG. 2 illustrates an example of an arrangement of charging cells from two perspectives 200, 210 when multiple layers are overlaid within a segment of a charging surface that may be adapted in accordance with certain aspects disclosed herein. Layers of charging cells 202, 204, 206, 208 provided within a segment of a charging surface. The charging cells within each layer of charging cells 202, 204, 206, 208 are arranged according to a honeycomb packaging configuration. In one example, the layers of charging cells 202, 204, 206, 208 may be formed on a printed circuit board that has four or more layers. The arrangement of charging cells 100 can be selected to provide complete coverage of a designated charging area that is adjacent to the illustrated segment.

Passive Ping

In accordance with certain aspects disclosed herein, location sensing may rely on changes in some property of the electrical conductors that form coils in a charging cell. Measurable differences in properties of the electrical conductors may include changes in capacitance, resistance, inductance and/or temperature when an object is placed in proximity to one or more coils. In some examples, placement of an object on the charging surface can affect the measurable resistance, capacitance, inductance of a coil located near the point of placement. In some implementations, circuits may be provided to measure changes in resistance, capacitance, and/or inductance of one or more coils located near the point of placement. In some implementations, sensors may be provided to enable location sensing through detection of changes in touch, pressure, load and/or strain in the charging surface. Conventional techniques used in current wireless charging applications for detecting devices employ "ping" methods that drive the transmitting coil and consume substantial power (e.g., 100-200 mW). The field generated by the transmitting coil is used to detect a receiving device.

Wireless charging devices may be adapted in accordance with certain aspects disclosed herein to support a low-power discovery technique that can replace and/or supplement conventional ping transmissions. A conventional ping is produced by driving a resonant LC circuit that includes a transmitting coil of a base station. The base station then waits for an ASK-modulated response from the receiving device. A low-power discovery technique may include utilizing a passive ping to provide fast and/or low-power discovery. According to certain aspects, a passive ping may be produced by driving a network that includes the resonant LC circuit with a fast pulse that includes a small amount of energy. The fast pulse excites the resonant LC circuit and causes the network to oscillate at its natural resonant frequency until the injected energy decays and is dissipated. In one example, the fast pulse may have a duration corresponding to a half cycle of the resonant frequency of the network and/or the resonant LC circuit. When the base station is configured for wireless transmission of power within the frequency range 100 kHz to 200 kHz, the fast pulse may have a duration that is less than 2.5 µs.

The passive ping may be characterized and/or configured based on the natural frequency at which the network including the resonant LC circuit rings, and the rate of decay of energy in the network. The ringing frequency of the network and/or resonant LC circuit may be defined as:

$$\omega = \frac{1}{\sqrt{LC}} \qquad (Eq.1)$$

The rate of decay is controlled by the quality factor (Q factor) of the oscillator network, as defined by:

$$Q = \frac{1}{R}\sqrt{\frac{L}{C}} \qquad (Eq.2)$$

Equations 1 and 2 show that resonant frequency is affected by L and C, while the Q factor is affected by L, C and R. In a base station provided in accordance with certain aspects disclosed herein, the wireless driver has a fixed value of C determined by the selection of the resonant capacitor. The values of L and R are determined by the wireless transmitting coil and by an object or device placed adjacent to the wireless transmitting coil.

The wireless transmitting coil is configured to be magnetically coupled with a receiving coil in a device placed within close proximity of the transmitting coil, and to couple some of its energy into the proximate device to be charged. The L and R values of the transmitter circuit can be affected by the characteristics of the device to be charged, and/or other objects within close proximity of the transmitting coil. As an example, if a piece of ferrous material with a high magnetic permeability placed near the transmitter coils can increase the total inductance (L) of the transmitter coil, resulting in a lower resonant frequency, as shown by Equation 1. Some energy may be lost through heating of materials due to eddy current induction, and these losses may be characterized as an increase the value of R thereby lowering the Q factor, as shown by Equation 2.

A wireless receiver placed in close proximity to the transmitter coil can also affect the Q factor and resonant frequency. The receiver may include a tuned LC network with a high Q which can result in the transmitter coil having a lower Q factor. The resonant frequency of the transmitter coil may be reduced due to the addition of the magnetic material in the receiver, which is now part of the total magnetic system. Table 1 illustrates certain effects attributable to different types of objects placed within close proximity to the transmitter coil.

TABLE 1

| Object | L | R | Q | Frequency |
|---|---|---|---|---|
| None present | Base Value | Base value | Base Value (High) | Base Value |
| Ferrous | Small | Large | Large | Small |

TABLE 1-continued

| Object | L | R | Q | Frequency |
|---|---|---|---|---|
| Non-ferrous | Increase Small Decrease | Increase Large Increase | Decrease Large Decrease | Decrease Small Increase |
| Wireless Receiver | Large Increase | Small Decrease | Small Decrease | Large Decrease |

Figure 3:
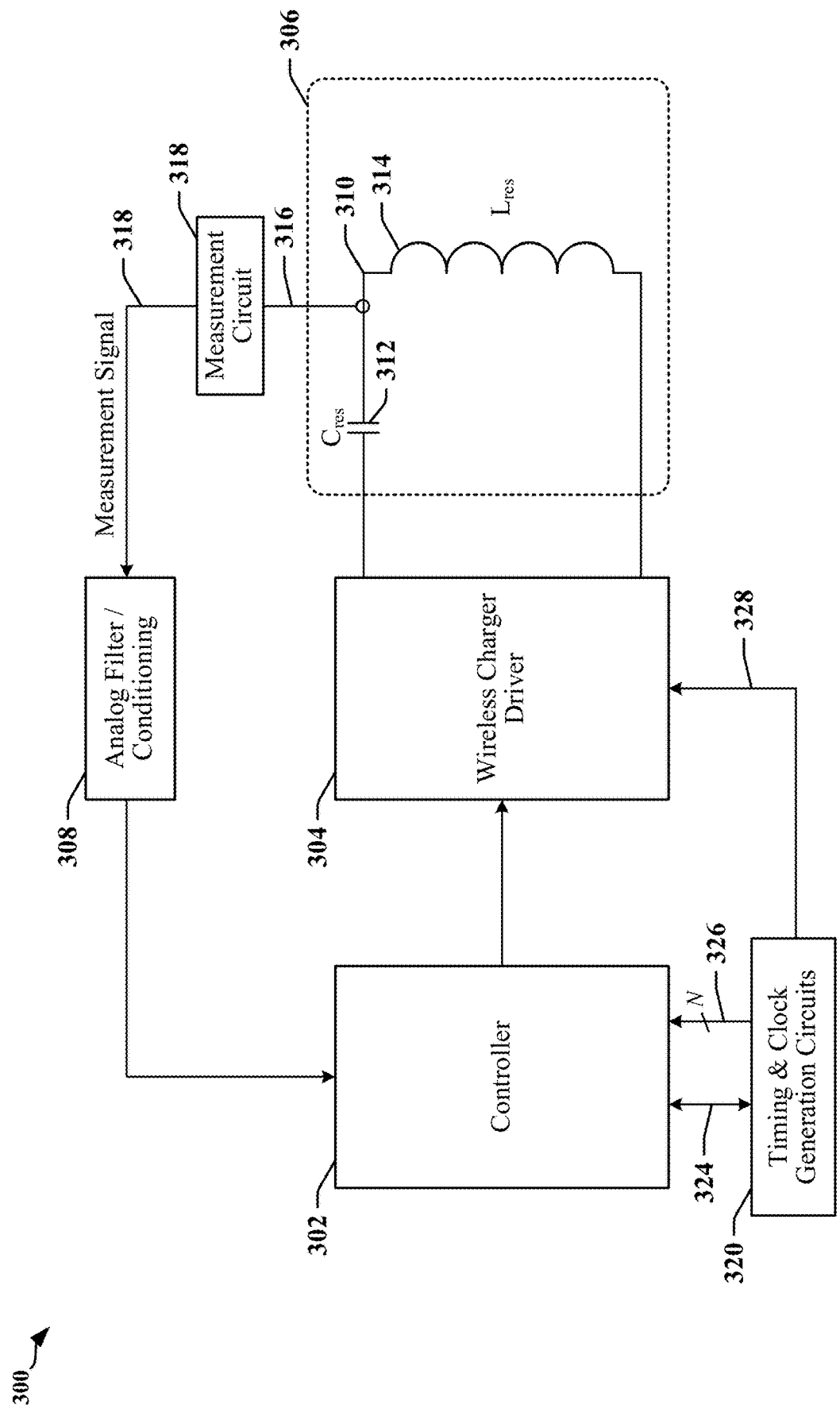
FIG. 3 illustrates a wireless transmitter that may be provided in a charger base station in accordance with certain aspects disclosed herein.

FIG. 3 illustrates a wireless transmitter 300 that may be provided in a charger base station. A controller 302 may receive a feedback signal filtered or otherwise processed by a filter circuit 308. The controller may control the operation of a driver circuit 304. The driver circuit 304 provides an alternating current to a resonant circuit 306 that includes a capacitor 312 and inductor 314. The frequency of the alternating current may be determined by a charging clock signal 328 provided by timing circuits 320. A measurement circuit may obtain a measurement signal 318 indicative of current flow or voltage 316 measured at an LC node 310 of the resonant circuit 306. The measurement signal 318 may be used to calculate or estimate Q factor of the resonant circuit 306.

The timing circuits 320 may provide the controller with one or more clock signals 324, including a system clock signal that controls the operation of the controller 302. The one or more clock signals 324 may further include a clock signal used to modulate or demodulate a data signal carried on a charging current in the resonant circuit 306. The timing circuits 320 may include configurable clock generators that produce signals at frequencies defined by configuration information, including the charging clock signal 328. The timing circuits 320 may be coupled to the controller through an interface 326. The controller 302 may configure the frequency of the charging clock signal 328. In some implementations, the controller 302 may configure the duration and frequency of a pulsed signal used for passive ping in accordance with certain aspects disclosed herein. In one example, the pulsed signal includes a number of cycles of the pulsed signal.

Passive ping techniques may use the voltage and/or current measured or observed at the LC node 310 to identify the presence of a receiving coil in proximity to the charging pad of a device adapted in accordance with certain aspects disclosed herein. Many conventional wireless charger transmitters include circuits that measure voltage at the LC node 310 or measure the current in the network. These voltages and currents may be monitored for power regulation purposes and/or to support communication between devices. In the example illustrated in FIG. 3, voltage at the LC node 310 may be measured, although it is contemplated that a circuit may be adapted or provided such that current can additionally or alternatively be monitored to support passive ping. A response of the resonant circuit 306 to a passive ping (initial voltage $V_0$) may be represented by the voltage ($V_{LC}$) at the LC node 310, such that:

$$V_{LC} = V_0 e^{-\left(\frac{\omega}{2Q}\right)t} \qquad \text{(Eq. 3)}$$

Figure 4:
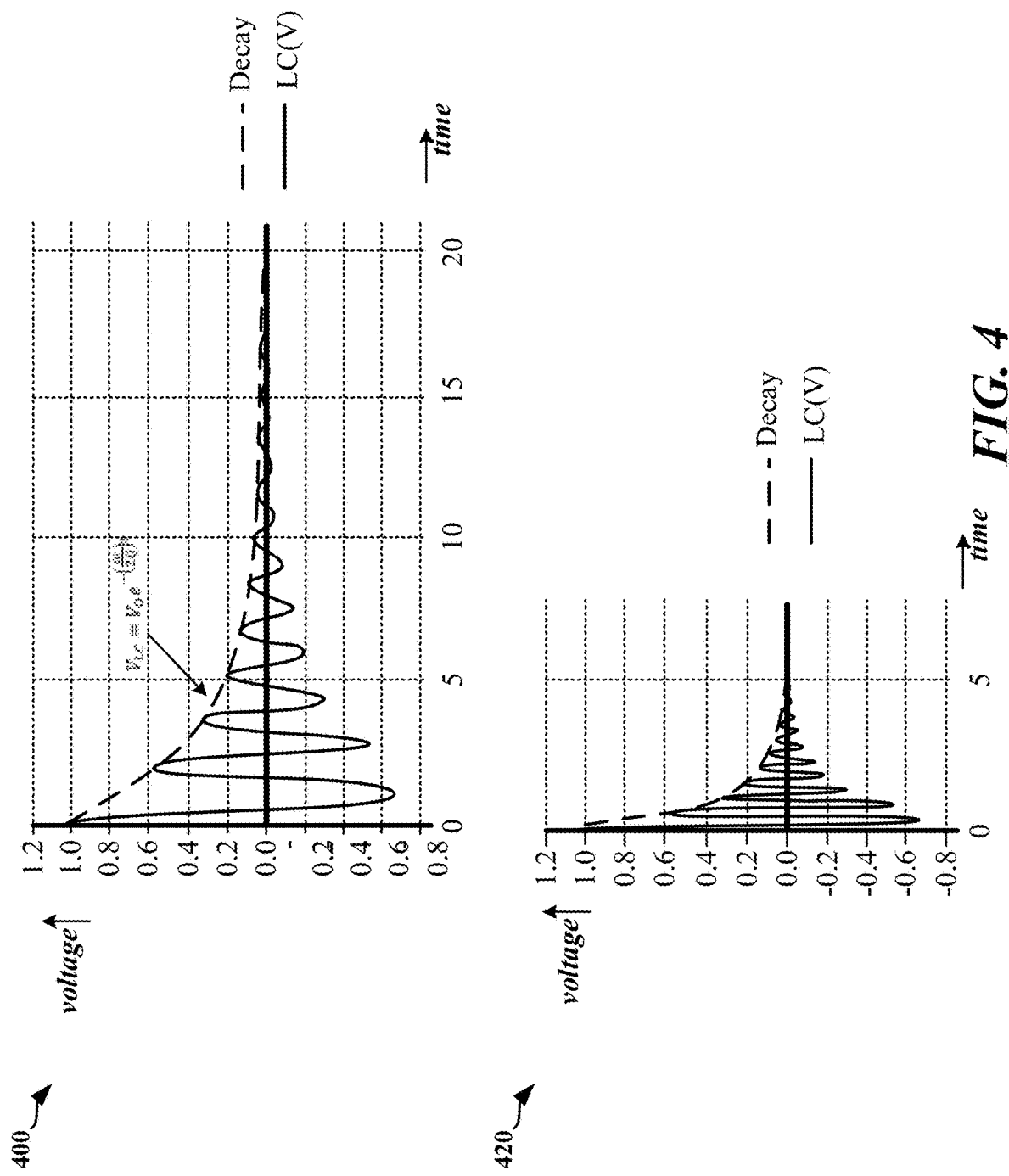
FIG. 4 illustrates a first example of a response to a passive ping in accordance with certain aspects disclosed herein.

FIG. 4 illustrates examples of responses 400, 420 to a passive ping. In each of the responses 400, 420, an initial voltage decays according to Equation 3. After the excitation pulse at time=0, the voltage and/or current is seen to oscillate at the resonant frequency defined by Equation 1, and with a decay rate defined by Equation 3. The first cycle of oscillation begins at voltage level $V_0$ and $V_{LC}$ continues to decay to zero as controlled by the Q factor and ω. The first response 400 illustrates a typical open or unloaded response when no object is present or proximate to the charging pad. In this first response 400, the value of the Q factor may be assumed to be 20. The second response 420 illustrates a loaded response that may be observed when an object is present or proximate to the charging pad loads the coil. In the illustrated second response 420, the Q factor may have a value of 7. VIE oscillates at a higher frequency in the voltage response 420 with respect to the voltage response 400.

Figure 5:
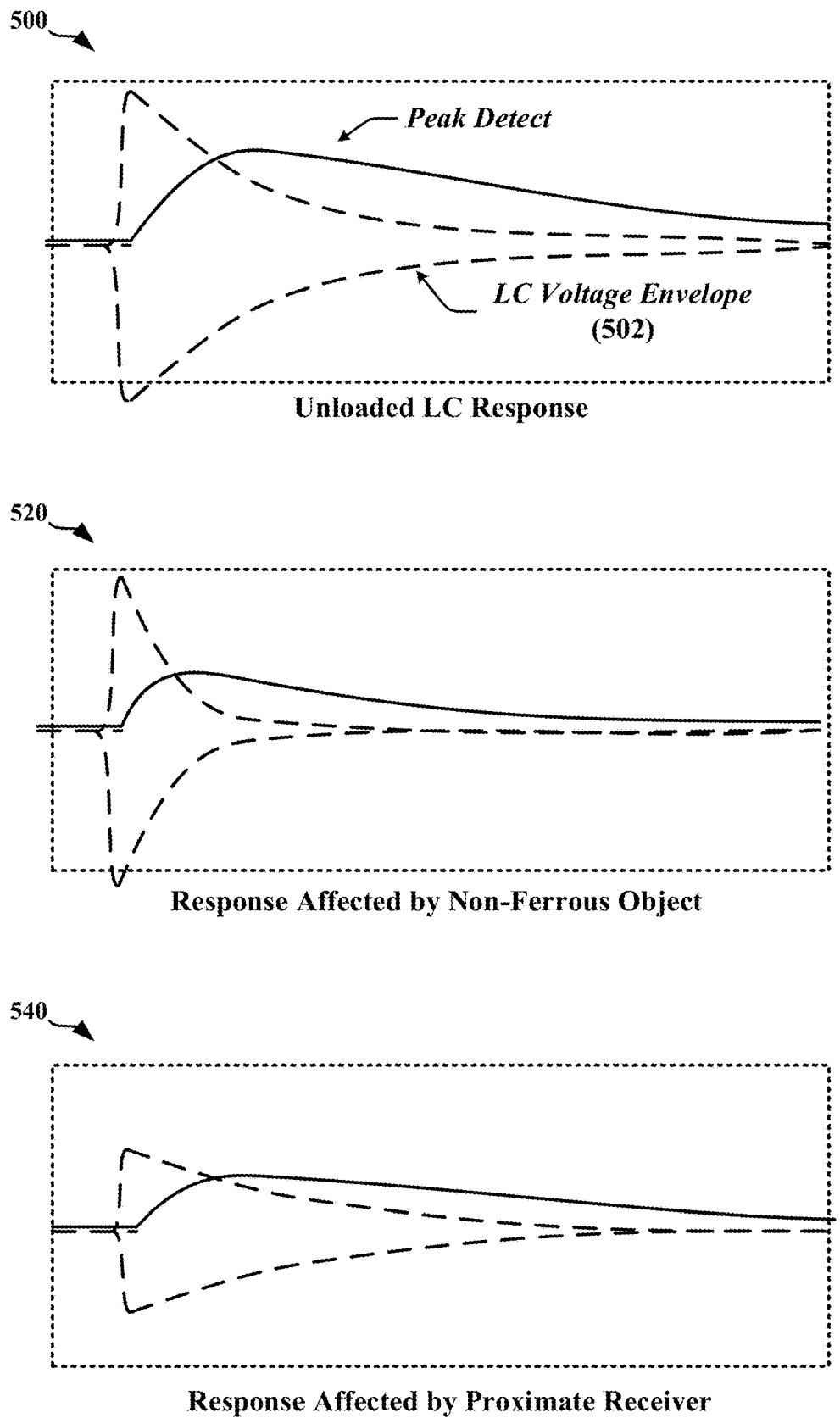
FIG. 5 illustrates examples of observed differences in responses to a passive ping in accordance with certain aspects disclosed herein.

FIG. 5 illustrates a set of examples in which differences in responses 500, 520, 540 may be observed. A passive ping is initiated when a driver circuit 304 excites the resonant circuit 306 using a pulse that is shorter than 2.5 μs. Different types of wireless receivers and foreign objects placed on the transmitter result in different responses observable in the voltage at the LC node 310 or current in the resonant circuit 306 of the transmitter. The differences may indicate variations in the Q factor of the resonant circuit 306 frequency of the oscillation of $V_0$. Table 2 illustrates certain examples of objects placed on the charging pad in relation to an open state.

TABLE 2

| Object | Frequency | $V_{peak}$ (mV) | 50% Decay Cycles | Q Factor |
|---|---|---|---|---|
| None present | 96.98 kHz | 134 mV | 4.5 | 20.385 |
| Type-1 Receiver | 64.39 kHz | 82 mV | 3.5 | 15.855 |
| Type-2 Receiver | 78.14 kHz | 78 mV | 3.5 | 15.855 |
| Type-3 Receiver | 76.38 kHz | 122 mV | 3.2 | 14.496 |
| Misaligned Type-3 Receiver | 210.40 kHz | 110 mV | 2.0 | 9.060 |
| Ferrous object | 93.80 kHz | 110 mV | 2.0 | 9.060 |
| Non-ferrous object | 100.30 kHz | 102 mV | 1.5 | 6.795 |

In Table 2, the Q factor may be calculated as follows:

$$Q = \frac{\pi N}{\ln(2)} \cong 4.53N, \qquad \text{(Eq. 4)}$$

where N is the number of cycles from excitation until amplitude falls below 0.5 $V_0$.

Figure 6:
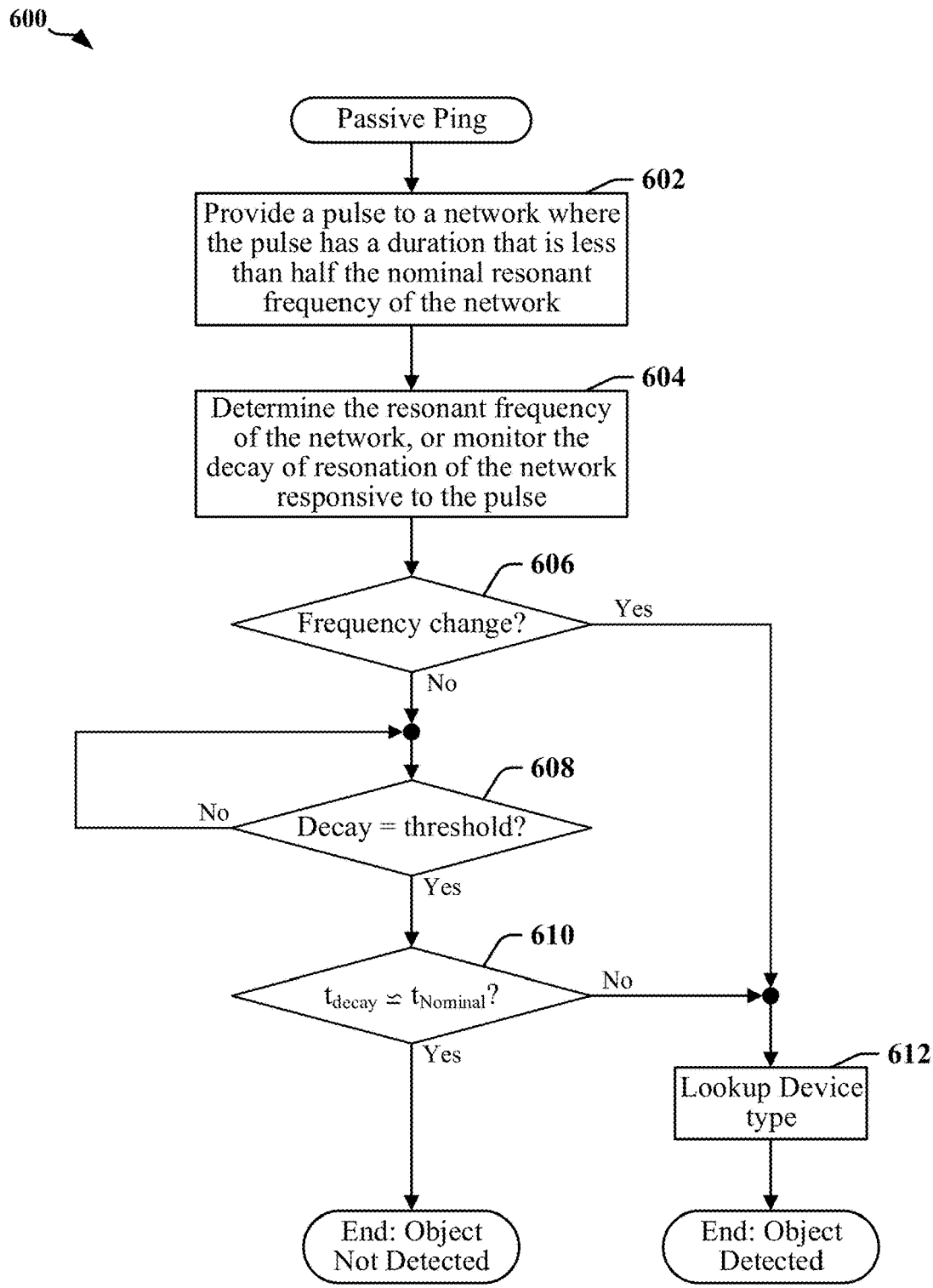
FIG. 6 is a flowchart that illustrates a method involving passive ping implemented in a wireless charging device adapted in accordance with certain aspects disclosed herein.

FIG. 6 is a flowchart 600 that illustrates a method involving passive ping implemented in a wireless charging device adapted in accordance with certain aspects disclosed herein. At block 602, a controller may generate a short excitation pulse and may provide the short excitation pulse to a network that includes a resonant circuit. The network may have a nominal resonant frequency and the short excitation pulse may have a duration that is less than half the nominal resonant frequency of the network. The nominal resonant frequency may be observed when the transmitting coil of the resonant circuit is isolated from external objects, including ferrous objects, non-ferrous objects and/or receiving coils in a device to be charged.

At block 604, the controller may determine the resonant frequency of the network or may monitor the decay of resonation of the network responsive to the pulse. According to certain aspects disclosed herein, the resonant frequency and/or the Q factor associated with the network may be altered when a device or other object is placed in proximity to the transmitting coil. The resonant frequency may be increased or decreased from the nominal resonant frequency observed when the transmitting coil of the resonant circuit is isolated from external objects. The Q factor of the network may be increased or decreased with respect to a nominal Q factor measurable when the transmitting coil of the resonant circuit is isolated from external objects. According to certain aspects disclosed herein, the duration of delay can be indicative of the presence or type of an object placed in proximity to the transmitting coil when differences in Q factor prolong or accelerate decay of amplitude of oscillation in the resonant circuit with respect to delays associated with a nominal Q factor.

In one example, the controller may determine the resonant frequency of the network using a transition detector circuit configured to detect zero crossings of a signal representative of the voltage at the LC node 310 using a comparator or the like. In some instances, direct current (DC) components may be filtered from the signal to provide a zero crossing. In some instances, the comparator may account for a DC component using an offset to detect crossings of a common voltage level. A counter may be employed to count the detected zero crossings. In another example the controller may determine the resonant frequency of the network using a transition detector circuit configured to detect crossings through a threshold voltage by a signal representative of the voltage at the LC node 310, where the amplitude of the signal is clamped or limited within a range of voltages that can be detected and monitored by logic circuits. In this example, a counter may be employed to count transitions in the signal. The resonant frequency of the network may be measured, estimated and/or calculated using other methodologies.

In another example, a timer or counter may be employed to determine the time taken for $V_{LC}$ to decay from voltage level $V_0$ to a threshold voltage level. The elapsed time may be used to represent a decay characteristic of the network. The threshold voltage level may be selected to provide sufficient granularity to enable a counter or timer to distinguish between various responses 500, 520, 540 to the pulse. $V_{LC}$ may be represented by detected or measured peak, peak-to-peak, envelope 502 and/or rectified voltage level. The decay characteristic of the network may be measured, estimated and/or calculated using other methodologies.

If at block 606, the controller determines that a change in resonant frequency with respect to a nominal resonant frequency indicate presence of an object in proximity to the transmitting coil, the controller may attempt to identify the object at block 612. If the controller determines at block 606 that resonant frequency is substantially the same as the nominal resonant frequency, the controller may consider the decay characteristic of the amplitude of oscillation in the resonant circuit at block 608. The controller may determine that the resonant frequency of the network is substantially the same as the nominal resonant frequency when the frequency remains within a defined frequency range centered on, or including the nominal resonant frequency. In some implementations, the controller may identify objects using changes in resonant frequency and decay characteristics. In these latter implementations, the controller may continue at block 608 regardless of resonant frequency, and may use changes in change in resonant frequency as an additional parameter when identifying an object positioned proximately the transmission coil.

At block 608, the controller may use a timer and/or may count the cycles of the oscillation in the resonant circuit that have elapsed between the initial $V_O$ amplitude and a threshold amplitude used to assess the decay characteristic. In one example, $V_O/2$ may be selected as the threshold amplitude.

At block 610, the number of cycles or the elapsed time between the initial $V_O$ amplitude and the threshold amplitude may be used to characterize decay in the amplitude of oscillation in the resonant circuit, and to compare the characterize decay with a corresponding nominal decay characteristic. If at block 610, no change in frequency and delay characteristic is detected, the controller may terminate the procedure with a determination that no object is proximately located to the transmission coil. If at block 610, a change in frequency and/or delay characteristic has been detected, the controller may identify the object at block 612.

At block 612, the controller may be configured to identify receiving devices placed on a charging pad. The controller may be configured to ignore other types of objects, or receiving devices that are not optimally placed on the charging pad including, for example, receiving devices that are misaligned with the transmission coil that provides the passive ping. In some implementations, the controller may use a lookup table indexed by resonant frequency, decay time, change in resonant frequency, change in decay time and/or Q factor estimates. The lookup table may provide information identifying specific device types, and/or charging parameters to be used when charging the identified device or type of device.

Passive ping uses a very short excitation pulse that can be less than a half-cycle of the nominal resonant frequency observed at the LC node 310 in the resonant circuit 306. A conventional ping may actively drive a transmission coil for more than 16,000 cycles. The power and time consumed by a conventional ping can exceed the power and time use of a passive ping by several orders of magnitude. In one example, a passive ping consumes approximately 0.25 µJ per ping with a max ping time of around ~100 µs, while a conventional active ping consumes approximately 80 mJ per ping with a max ping time of around 90 ms. In this example, energy dissipation may be reduced by a factor of 320,000 and the time per ping may be reduced by a factor of 300.

Detection and characterization of the decay of the voltage at the LC node 310 may require fast, sensitive and/or low-voltage circuits to accommodate the low-power nature of resonant signals at the LC node 310 when a short excitation pulse is used to produce resonant signals in the resonant circuit 306. In some instances, passive ping may be implemented using a burst of energy at the nominal resonant frequency of the resonant circuit 306. The burst of energy may have a duration of several periods of the nominal resonant frequency. This burst-mode passive ping necessarily consumes more energy per ping that passive ping that is initiated by short excitation pulses. The additional energy provides additional time to characterize resonant response.

Figure 7:
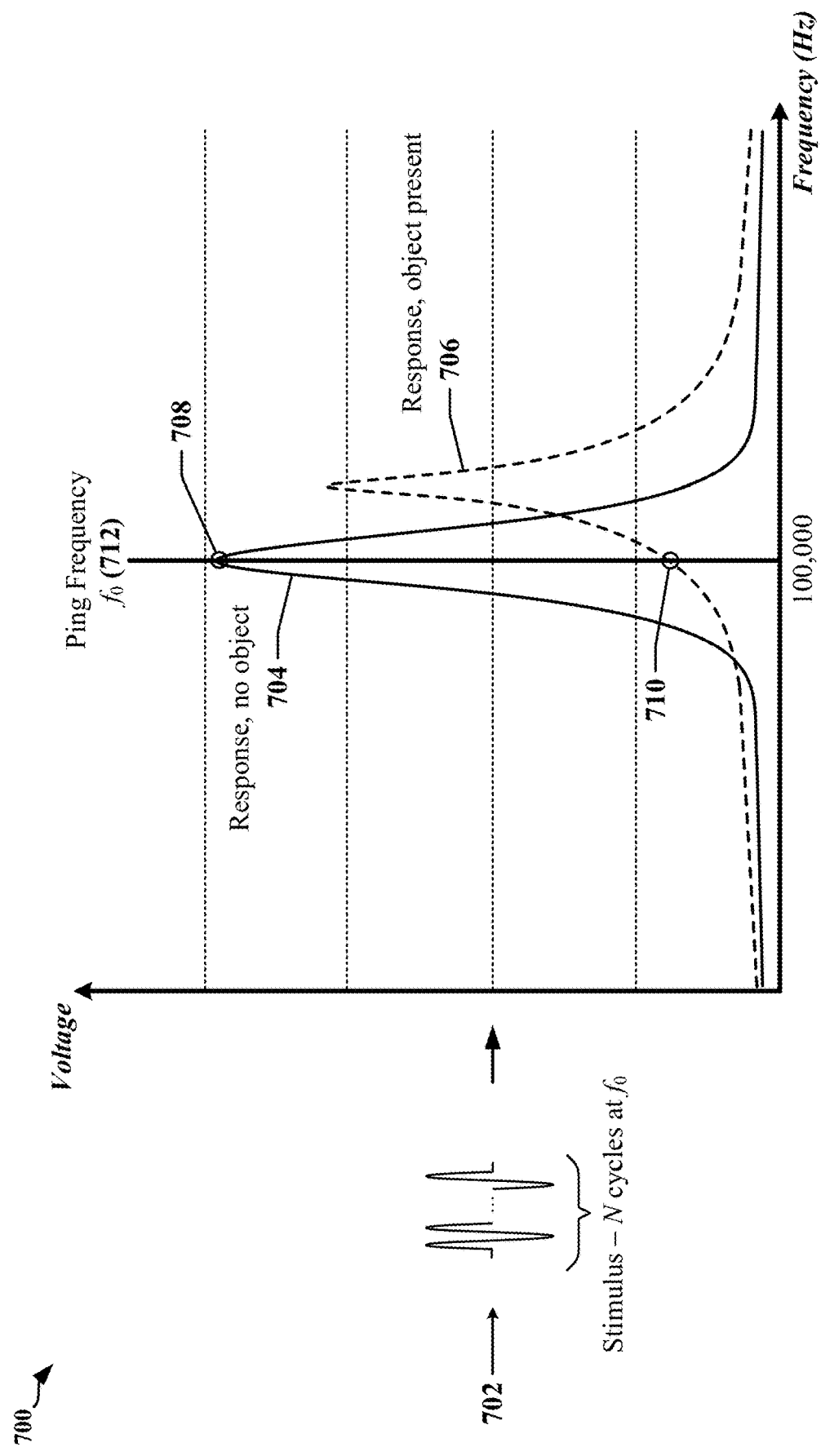
FIG. 7 illustrates frequency response of a resonant circuit to a ping provided at the resonant frequency of the resonant circuit.

FIG. 7 illustrates an example of frequency response 700 of the resonant circuit 306 when the resonant circuit 306 is stimulated by a ping (here, a passive ping 702) that includes several cycles of a signal that oscillates at or near the nominal resonant frequency ($f_o$ 712) of the resonant circuit 306. A first frequency response 704 illustrates the response of the resonant circuit 306 when no device is present, while a second frequency response 706 illustrates the response of the resonant circuit 306 when a chargeable object is present. The chargeable object reduces the Q-factor of the resonant circuit 306. The higher Q-factor of the resonant circuit 306 when no device is present causes the resonant circuit 306 to produce a significantly higher voltage response 708 and draw the maximum current with the longest decay time in response to a passive ping 702 at $f_o$ 712 than the voltage response 710 produced when a chargeable device lowers the Q-factor of the resonant circuit 306, causing the resonant circuit 306 to produce lower voltage, draw less current and have a shorter decay time in response to a passive ping at $f_0$ 712. In typical applications, no object is present for a majority of the time a charging device is in operation, and the resonant circuit 306 in the charging device has a high Q-factor for a majority of the time. The high Q-factor results in a high power draw. The resonant circuit 306 has a slower response time when it has a high Q-factor, since more time is needed for the energy in the passive ping 702 to decay thereby delaying initiation of another ping.

An improved passive ping technique implemented in accordance with certain aspects disclosed herein can reduce power consumption associated with passive pings 702 and can increase the ping rate. The improved passive ping technique may use a frequency that is significantly different from the resonant frequency of the resonant circuit 306.

Figure 8:
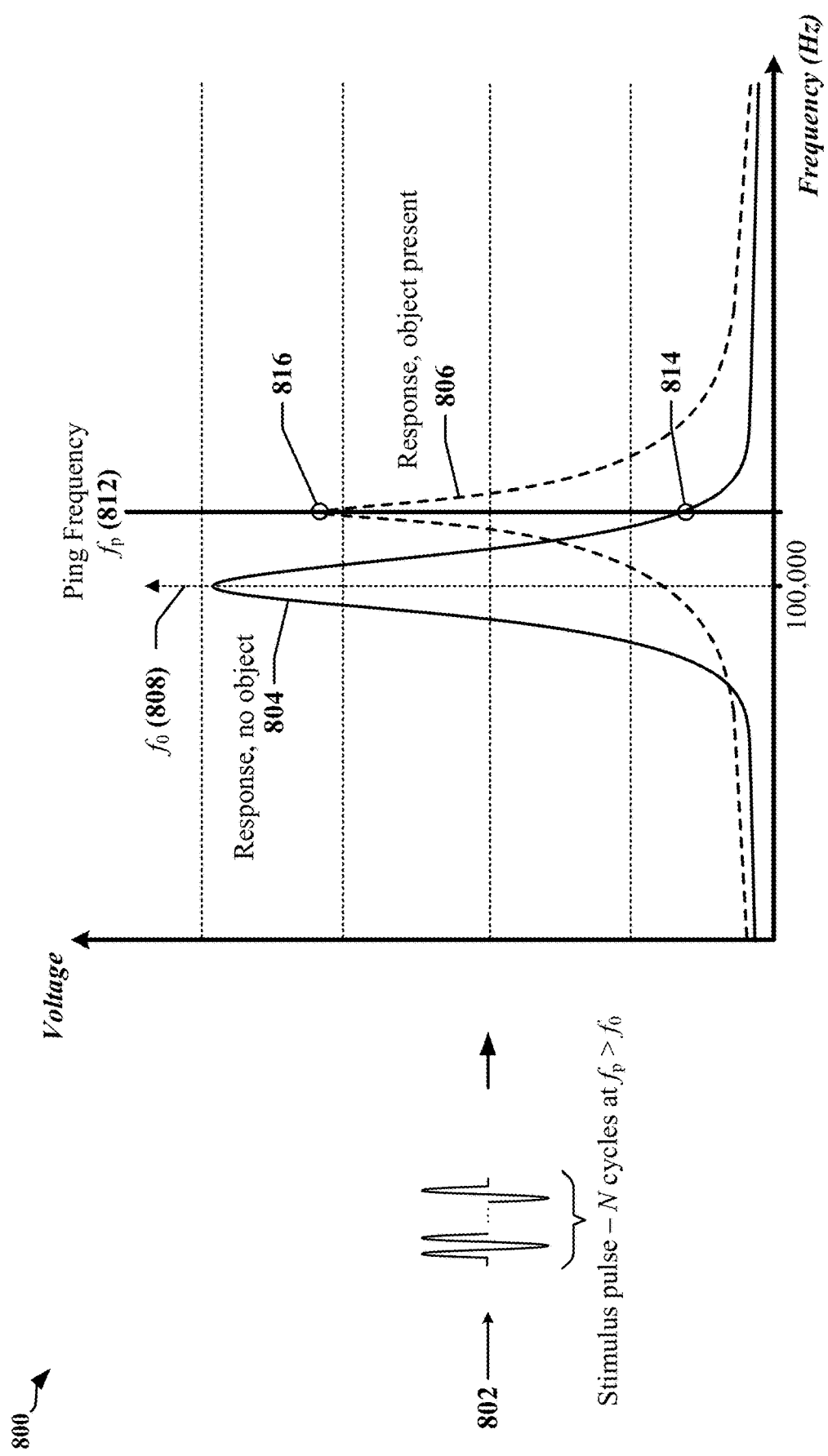
FIG. 8 illustrates frequency response of a resonant circuit illustrating the effect of a ping provided at a frequency greater than the resonant frequency of the resonant circuit in accordance with certain aspects disclosed herein.

FIG. 8 illustrates an example of frequency responses 800 of the resonant circuit 306 illustrating the effect of a ping (here, a pulse 802) provided as burst of a stimulation signal that oscillates at a frequency ($f_p$ 812) that is greater than the nominal resonant frequency ($f_0$ 808) of the resonant circuit 306. The burst spans two or more cycles of the stimulation signal. In one example, the duration of the burst may be controlled by a timer. In another example, the stimulation may be modulated using a gating signal that causes the stimulation signal to be provided to the resonant circuit at a desired repetition rate and with an active duration that defines the number of cycles of the stimulation signal in the burst. In some implementations, the ping is provided as a multi-cycle burst of a stimulation signal that has a frequency that is lower than $f_0$ 808.

The use of a stimulation signal that has a frequency different from the resonant frequency of the resonant circuit 306 can result in the dominant state of the charging device, where no chargeable object is present, to have a lower power draw and faster decay rate than would be expected for a stimulation signal that has a frequency at or near the resonant frequency of the resonant circuit 306. The use of a non-resonant stimulation signal can provide improved performance with respect to the example illustrated in FIG. 7. The disclosed ping technique can result in increased decay rates and can limit the occurrence of higher-power draws to pulses 802 that lead to detection of a chargeable object. Additional pulses 802 are typically superfluous after detection.

The resonant circuit 306 may be stimulated during a passive ping procedure by a pulsed signal that includes pulses of a duration that can include several cycles at $f_p$ 812. A first frequency response 804 illustrates the response of the resonant circuit 306 to a pulse 802 when no device is present, while a second frequency response 806 illustrates the response of the resonant circuit 306 to a pulse 802 when a chargeable object is present. The effect of the chargeable object on the resonant circuit 306 may be exhibited in a reduction in the Q-factor of the resonant circuit 306. The resonant circuit 306 produces a significantly lower voltage level 814 and draws a lower current with a shorter decay time in response to a ping at $f_p$ 812 when no device is present than the voltage level 816 produced when a chargeable device is present. In typical applications, no object is present for a majority of the time a charging device is in operation, and the resonant circuit 306 exhibits a lower power consumption and a faster decay time per ping with respect to the example illustrated in FIG. 7.

The frequency spread ($f_p$-$f_0$ or $f_0$-$f_p$) between the resonant frequency ($f_0$ 808) and the ping frequency ($f_p$ 812) may be proportionate to the value of $f_0$ 808. For example, the frequency spread may increase as $f_0$ 808 increases. In some implementations, the frequency spread and $f_0$ 808a have a logarithmic (log base 10) relationship. In an example that is compliant or compatible with Qi standards, where 80 Khz<$f_0$<110 Khz, a passive ping frequency may be defined such that 175 KHz<$f_p$<210 KHz.

According to certain aspects disclosed herein, frequency spread may be selected as a trade-off between signal-to-noise ratio (SNR) and power consumption or response time. In the example illustrated in FIG. 8, an overly-high value for frequency spread may result in lower SNR, while an overly-high value for frequency spread may result in high power draw and/or slow response. The optimal balance between SNR and power draw may vary by application. In some implementations, the lowest power and fast scan rate is obtained by setting $f_p$ 812 as high as possible while permitting reliable detection of objects given SNR for the system.

The duration of a pulse 802 can be defined as a number of fractions of a cycle of $f_p$ 812. In one example, the duration of the passive ping pulse may be set to a half-cycle of $f_p$ 812. In another example, the duration of the passive ping pulse may be set to multiple cycles of $f_p$ 812. In some implementations, the duration of the passive ping pulse includes enough half-cycles of $f_p$ 812 to obtain a current draw in the detectable range of an analog-to-digital converter (ADC) in microprocessor of a charging device. The passive ping pulse may include additional cycles to accommodate the SNR margin. The number of additional cycles may be the subject of a trade-off to increase the SNR, while limiting power and ping time. In one example, where $f_p$=190 KHz and $f_0$=100 KHz, the duration of the passive ping pulse is less than 100 µS.

The repetition rate for pulses 802 in a pulsed stimulus signal can be determined dynamically when speed of detection is prioritized. In one example, the ADC can be checked to determine when current has fallen back to zero before launching the next pulse 802. In this manner, a detection circuit can determine that no energy remains in the resonant circuit 306 from the pulse 802 before initiating the next pulse 802. In some implementations, a fixed delay between pulses 802 may be implemented. In one example, the fixed delay may be configured to be 6 times the longest decay time constant expected or observed in the resonant circuit 306. In one example, the fixed delay may be configured to provide a one millisecond interval between pulses. The one millisecond ping interval may enable an 18 coil charging pad to be scanned in 18 mS, permitting sub-second device detection. The fixed time approach can be used if further optimization for speed is not necessary. For example, a dynamic ping interval may be used when larger numbers of charging coils are provided in a charging pad.

Figure 9:
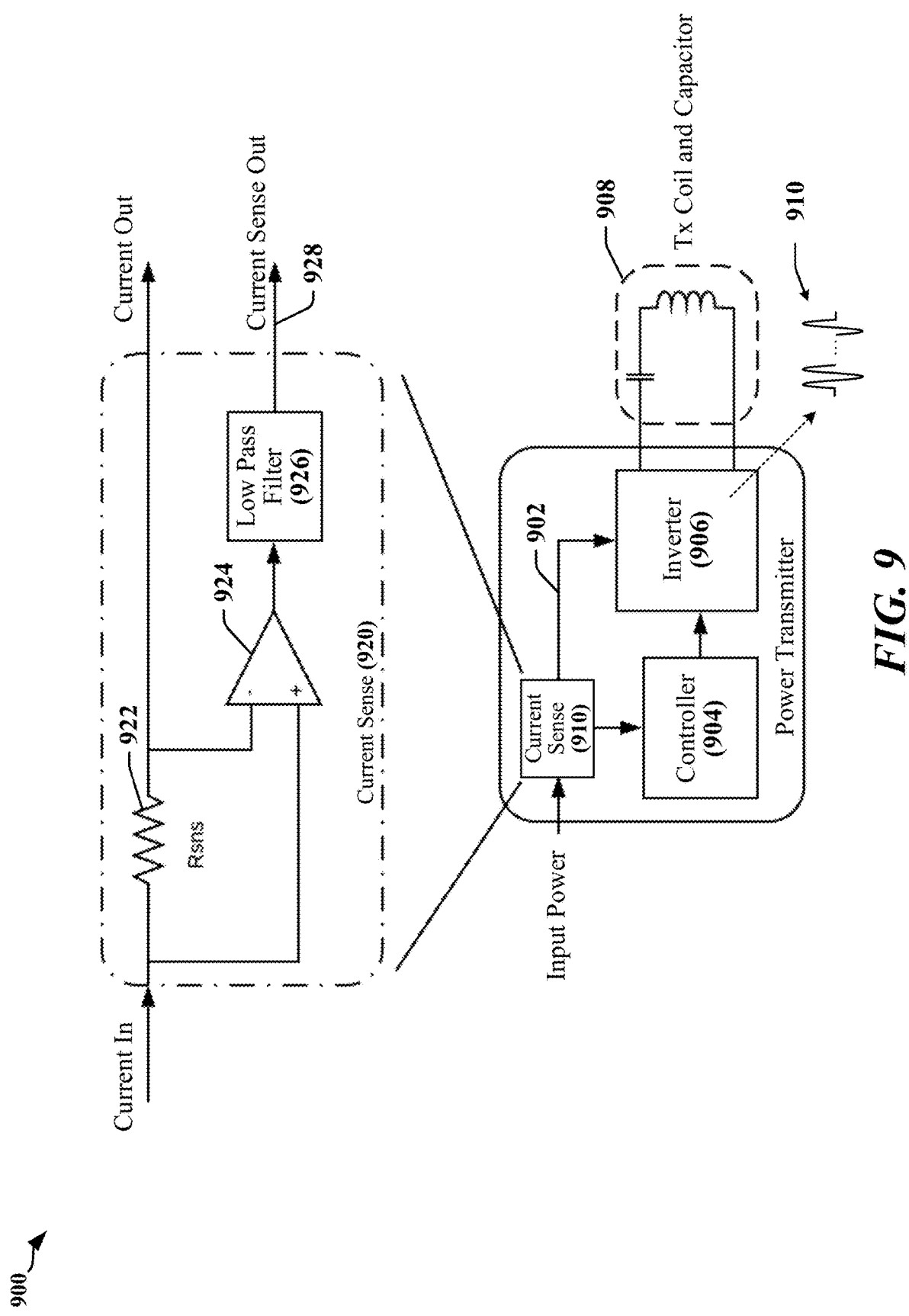
FIG. 9 illustrates a circuit that may be used to measure response of a resonant circuit to a passive ping in accordance with certain aspects disclosed herein.

FIG. 9 illustrates a circuit 900 that may be used to measure response of a resonant circuit in a passive ping procedure. In the illustrated example, the circuit 900 monitors the power 902 supplied to an inverter 906 that produces the pulse 910. The power 902 may be measured as current flow to the resonant circuit 908. In some implementations, power 902 may be measured as a voltage across the resonant circuit 908. In the illustrated example, a current sensing circuit 920 provides measurements to a controller 904 that configures, initiates and/or triggers pulses 910 provided to the resonant circuit 908. In one example, the current sensing circuit 920 uses a comparator 924 to measure the voltage across a low-value resistor 922 in the power supply coupling to the inverter 906. A low-pass filter 926 may be used to provide an average or root-mean square value as the output 928 of the current sensing circuit 920.

Passive ping procedures may also be coupled with another, reduced-power sensing methodology, such as capacitive sensing. Capacitive sensing or the like can provide an ultra-low power detection method that determines presence or non-presence of an object is in proximity to the charging surface. After capacitive sense detection, a passive ping can be transmitted sequentially or concurrently on each coil to produce a more accurate map of where a potential receiving device and/or object is located. After a passive ping procedure has been conducted, an active ping may be provided in the most likely device locations. An example algorithm for device location sensing, identification and charging is illustrated in FIG. 10.

Figure 10:
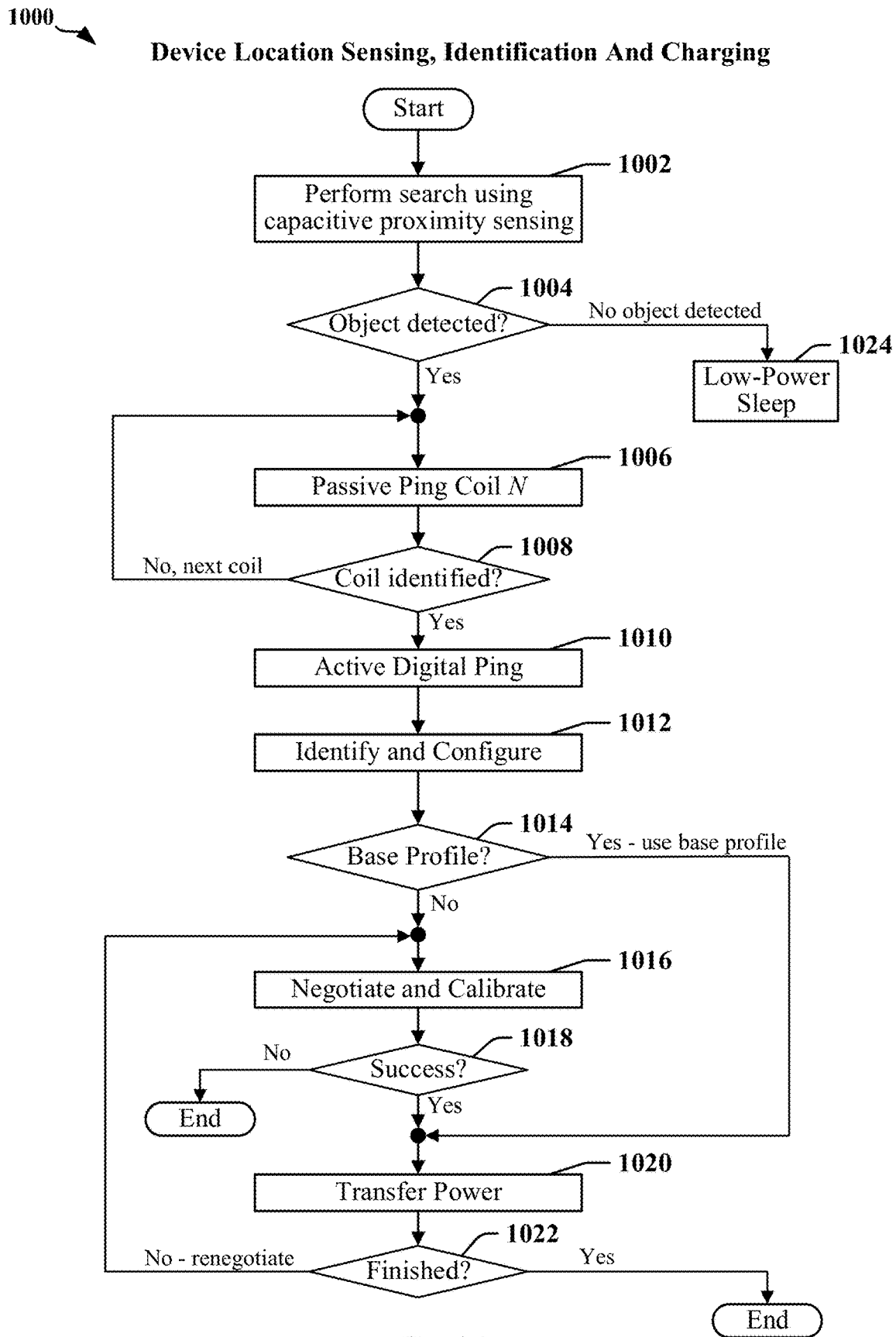
FIG. 10 is a flowchart that illustrates a power transfer management procedure that may be employed by a wireless charging device implemented in accordance with certain aspects disclosed herein.

FIG. 10 is a flowchart 1000 that illustrates a power transfer management procedure involving multiple sensing and/or interrogation techniques that may be employed by a wireless charging device implemented in accordance with certain aspects disclosed herein. The procedure may be initiated periodically and, in some instances, may be initiated after the wireless charging device exits a low-power or sleep state. In one example, the procedure may be repeated at a frequency calculated to provide sub-second response to placement of a device on a charging pad. The procedure may be re-entered when an error condition has been detected during a first execution of the procedure, and/or after charging of a device placed on the charging pad has been completed.

At block 1002, a controller may perform an initial search using capacitive proximity sensing. Capacitive proximity sensing may be performed quickly and with low power dissipation. In one example, capacitive proximity sensing may be performed iteratively, where one or more transmission coils is tested in each iteration. The number of transmission coils tested in each iteration may be determined by the number of sensing circuits available to the controller. At block 1004, the controller may determine whether capacitive proximity sensing has detected the presence or potential presence of an object proximate to one of the transmission coils. If no object is detected by capacitive proximity sensing, the controller may cause the charging device to enter a low-power, idle and/or sleep state at block 1024. If an object has been detected, the controller may initiate passive ping sensing at block 1006.

At block 1006, the controller may initiate passive ping sensing to confirm presence of an object near one or more transmission coils, and/or to evaluate the nature of the proximately-located object. Passive ping sensing may consume a similar quantity of power but span a greater of time than capacitive proximity sensing. In one example, each passive ping can be completed in approximately 100 µs and may expend 0.25 µJ. A passive ping may be provided to each transmission coil identified as being of-interest by capacitive proximity sensing. In some implementations, a passive ping may be provided to transmission coils near each transmission coil identified as being of-interest by capacitive proximity sensing, including overlaid transmission coils. At block 1008, the controller may determine whether passive ping sensing has detected the presence of a potentially chargeable device proximate to one of the transmission coils that may be a receiving device. If a potentially chargeable device has been detected, the controller may initiate active digital ping sensing at block 1010. If no potential chargeable device has been detected, passive ping sensing may continue at block 1006 until all of the coils have been tested and/or the controller terminates passive ping sensing. In one example, the controller terminates passive ping sensing after all transmitting coils have been tested. When passive ping sensing fails to find a potentially chargeable device, the controller the controller may cause the charging device to enter a low-power, idle and/or sleep state. In some implementations, passive ping sensing may be paused when a potentially chargeable device is detected so that an active ping can be used to interrogate the potentially chargeable device. Passive ping sensing may be resumed after the results of an active ping have been obtained.

At block 1010, the controller may use an active ping to interrogate a potentially chargeable device. The active ping may be provided to a transmitting coil identified by passive ping sensing. In one example, a standards-defined active ping exchange can be completed in approximately 90 ms and may expend 80 mJ. An active ping may be provided to each transmission coil associated with a potentially chargeable device.

At block 1012, the controller may identify and configure a chargeable device. The active ping provided at block 1010 may be configured to stimulate a chargeable device such that it transmits a response that includes information identifying the chargeable device. In some instances, the controller may fail to identify or configure a potentially chargeable device detected by passive ping, and the controller may resume a search based on passive ping at block 1006. At block 1014, the controller may determine whether a baseline charging profile or negotiated charging profile should be used to charge an identified chargeable device. The baseline, or default charging profile may be defined by standards. In one example, the baseline profile limits charging power to 5 W. In another example, a negotiated charging profile may enable charging to proceed at up to 17 W. When a baseline charging profile is selected, the controller may begin transferring power (charging) at block 1020.

At block 1016, the controller may initiate a standards-defined negotiation and calibration process that can optimize power transfer. The controller may negotiate with the chargeable device to determine an extended power profile that is different from a power profile defined for the baseline charging profile. The controller may determine at block 1018 that the negotiation and calibration process has failed and may terminate the power transfer management procedure. When the controller determines at block 1018 that the negotiation and calibration process has succeeded, charging in accordance with the negotiate profile may commence at block 1020.

At block 1022, the controller may determine whether charging has been successfully completed. In some instances, an error may be detected when a negotiated profile is used to control power transfer. In the latter instance, the controller may attempt to renegotiate and/or reconfigure the profile at block 1016. The controller may terminate the power transfer management procedure when charging has been successfully completed.

The use of passive ping techniques disclosed herein can enable rapid, low-power detection or discovery of devices or objects that have been placed or positioned proximate to a charging surface. A charging device that employs passive ping can benefit from reduced quiescent power draw, increased detection speed, and reduced radiated EMI. A conventional system that uses passive ping detection operates by providing a stimulating pulse that is used to measure a current or voltage value or rate of decay in order to determine a characteristic of the stimulated network. Conventional systems, for example, strive to detect changes in Q factor of a resonant circuit stimulated by the stimulating pulse. The value of the Q factor may be calculated or estimated base do a comparison of an electrical or electromagnetic signal to a threshold value.

Figure 11:
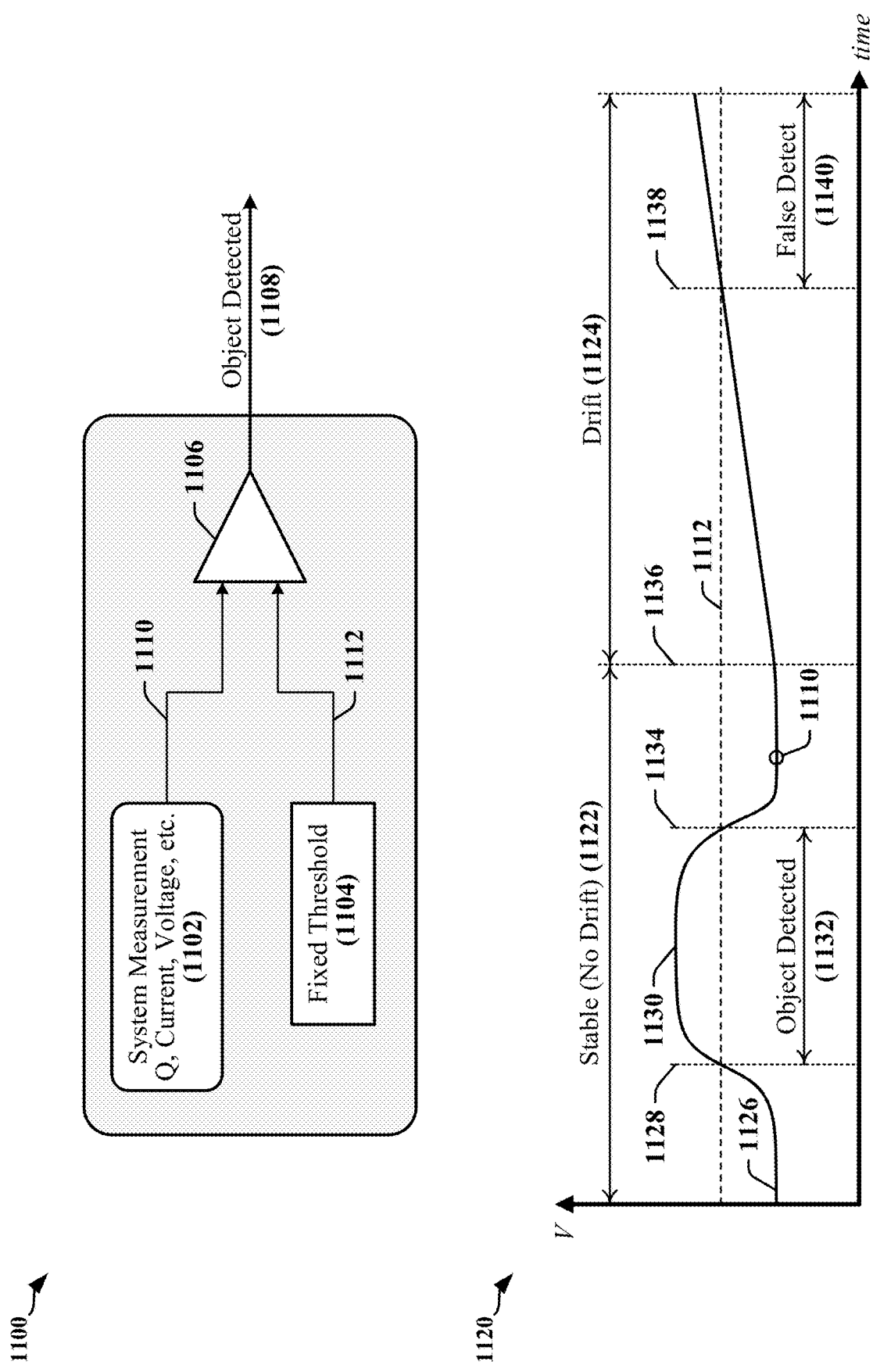
FIG. 11 illustrates a first example of a system that can be used to determine presence of an object in accordance with certain aspects disclosed herein.

FIG. 11 illustrates a system 1100 that can be used to determine presence of an object that is near or in contact with a resonant circuit. A measuring circuit 1102 may be used to measure and/or calculate one or more parameters that characterize the resonant circuit used for passive ping detection. The measured parameters may include the Q factor, voltage, current, impedance, frequency of oscillation, and so on. The measuring circuit 1102 provides a measurement signal 1110 that has a voltage level or carries a current representative of the measured parameter. The measurement signal 1110 is compared to a threshold signal 1112 using a comparator 1106 that provides a binary object detect signal 1108. In the illustrated system 1100, the threshold signal 1112 is produced by a reference circuit 1104 that is designed to provide a threshold signal with a constant, fixed voltage or current level to enable the system 1100 to reliably determine when a characteristic of the resonant circuit is changed sufficiently to indicate that an object has is close to a component of the resonant circuit.

In certain implementations, the level of the measurement signal 1110 or the threshold signal 1112 can drift. Drift can occur as a result of process, voltage and temperature (PVT) variations. Process variations arise during manufacture of integrated circuit (IC) devices and can cause the reference circuit 1104 in different devices to produce threshold signals 1112 with different voltage or current levels. Variations in voltage and temperature may be linked and/or can arise from variations in ambient temperature, power supply, interference, IC operating temperature, loading, stimulation variance, and other factors or causes. In one example, increases in temperature can increase the resistivity of copper, which can then notably affect the Q factor of a resonant circuit.

The graph 1120 shows an example of the effect of temperature variance on the measurement signal 1110. For simplicity, it is assumed that the level of the threshold signal 1112 remains constant. Initially, the system 1100 and the passive pulse resonant circuit are operating during a period of stability 1122, when the measurement signal 1110 is not affected by significant drift. In the illustrated example, the measurement signal 1110 is at a constant low voltage level 1126 when no object is placed near the resonant circuit. The measurement signal 1110 rises to a higher voltage level 1130 when an object is placed near a component of the resonant circuit, and the object detect signal 1108 switches active at a first point in time 1128 when the measurement signal 1110 rises above the level of the threshold signal 1112, indicating that an object has been detected. The system 1100 remains in an object detected state 1132 until the level of the measurement signal 1110 falls below the level of the threshold signal 1112 at a second point in time 1134 causing the system 1100 to exit the object detected state 1132.

A period of drift 1124 commences at a third point in time 1136. The drift may be caused by an increase in temperature, for example. The drift may increase the low voltage level 1126 present when no object is placed near the resonant circuit. At a fourth point in time 1138, the measurement signal 1110 rises above the level of the threshold signal 1112 causing the object detect signal 1108 to switch active although no object has been placed near the resonant circuit. The system 1100 enters a false object detected state 1140. In some instances, a decrease in temperature can lower the Q factor and reduce the detection sensitivity of the system 1100. In one example, the reduced detection sensitivity can result in the system failing to detect smaller devices.

Other types of PVT variation can cause variance in parameters that are assumed to be fixed by circuit designers and can negatively affect object detection sensitivity. In some conventional systems, compensation circuits may be provided to independently correct for drift in key components. However, the addition of compensation circuits can significantly increase cost and complexity, and other unforeseen sources of drift may arise during mass production and/or under operational conditions.

In accordance with certain aspects of this disclosure, an adaptive passive ping system may be deployed that can eliminate or reduce the effect of drift arising from PVT variations. Adaptive passive ping can be configured to determine presence of an object based on a rate of change of the measurement signal 1110, which may be represented algorithmically as a derivative of the measurement signal 1110. In one example, detection of an object is signaled when the rate of change of the measurement signal 1110 exceeds a specified or configured rate or delta (change).

Figure 12:
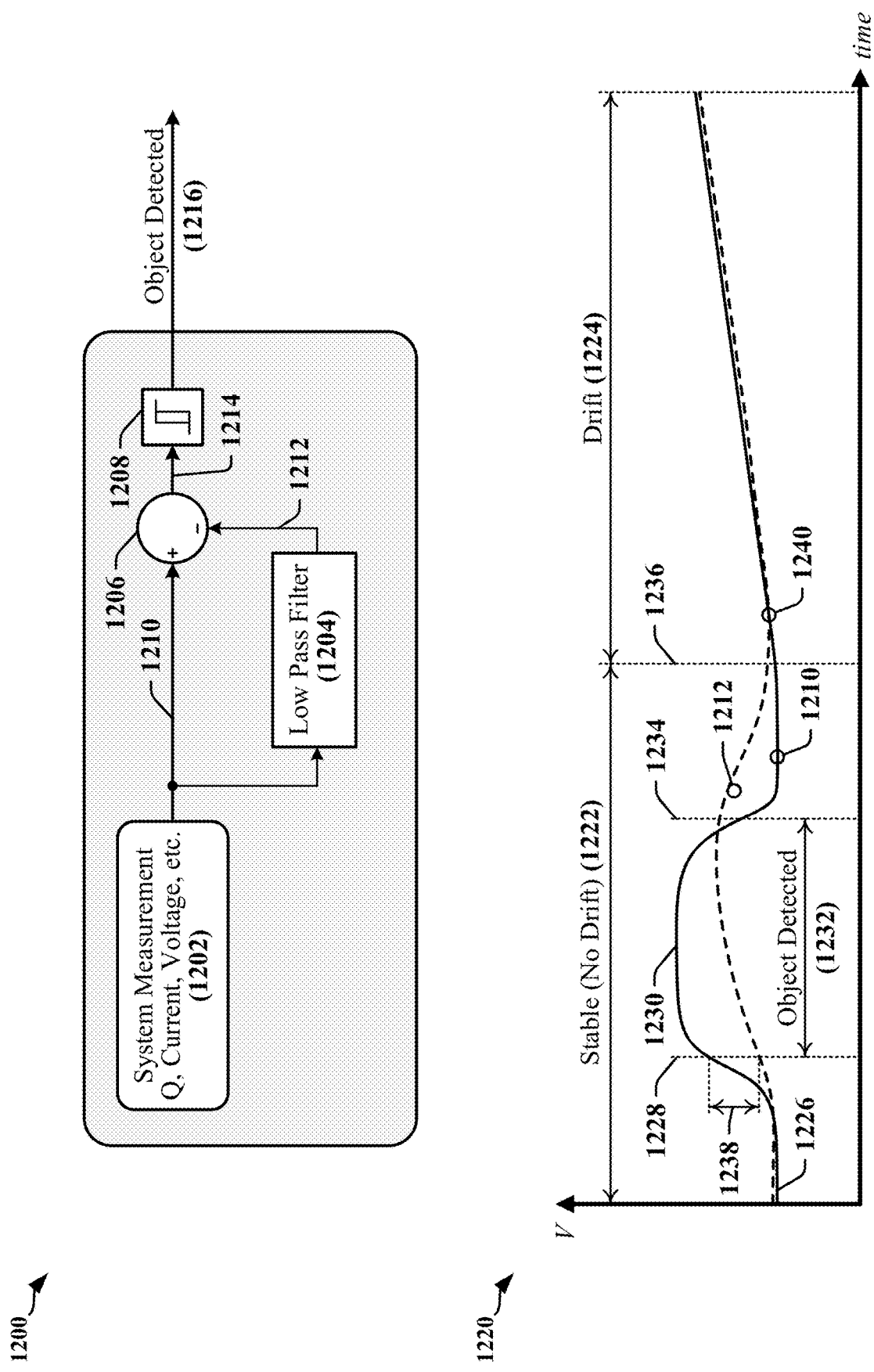
FIG. 12 illustrates a first example of a system that can be used to more reliably determine presence of an object in accordance with certain aspects disclosed herein.

FIG. 12 illustrates a system 1200 that may be adapted in accordance with certain aspects disclosed herein to reliably determine presence of an object that is near or in contact with a resonant circuit. The system 1200 can be configured to be tolerant of drift in voltage or current, where the drift may be attributable to PVT variations. In various implementations, the system 1200 employs adaptive passive ping thresholding that can be implemented in software, hardware or some combination thereof. In one example, adaptive passive ping thresholding can be implemented in programmable digital hardware using a low pass filter, a Finite Impulse Response (FIR) filter and/or another suitable digital filtering technique used to optimize a low pass filter. A FIR filter typically has an impulse response that has finite duration, and may be configured to settle within a desired, finite time.

The system 1200 illustrates an example in which adaptive passive ping thresholding is implemented in hardware using a low pass filter 1204 with a hysteresis comparator. In general, a comparator is a device that is used to differentiate between two signal levels. In one example, a comparator may be used to indicate which of the two signals has the greater voltage level. The comparator 1106 in FIG. 11 has one input coupled to a threshold signal 1112 that is nominally fixed, and the comparator 1106 output indicates whether a voltage level of the measurement signal 1110 is greater or less than the voltage level of the threshold signal 1112. Multiple transitions can occur when the level of the measurement signal 1110 is close to the level of the threshold signal 1112. A hysteresis comparator may be used to avoid multiple transitions by setting different upper and lower difference thresholds.

In some implementations, the hysteresis comparator includes a comparison circuit 1206 and a hysteresis circuit 1208 that compares the difference signal 1214 to a variable threshold level. The difference signal 1214 may be representative of difference between two input signals. The hysteresis circuit 1208 may be configured to suppress response to slow changes in the measurement signal 1210. The hysteresis circuit 1208 may be configured to suppress response to low-voltage changes in the measurement signal 1210 caused by variations in a voltage or a temperature associated with the apparatus. In some instances, the comparison circuit 1206 and the hysteresis circuit 1208 may be provided as separate physical components. In some instances, the comparison circuit 1206 and the hysteresis circuit 1208 may implemented in software, hardware or some combination of software and hardware. For example, the comparison circuit 1206 and the hysteresis circuit 1208 may be implemented using a digital signal processor or other programmable logic.

In one example, the detection signal 1216 transitions high when the voltage level of the difference signal 1214 exceeds a high threshold level defined for positive transitions (e.g., when the difference signal 1214 is rising), and the detection signal 1216 transitions low when the voltage level of the difference signal 1214 is less than a low threshold level defined for negative transitions (e.g., when the difference signal 1214 is falling). The combination of the low threshold level and the high threshold level may define a delta change threshold.

In the example of the system 1200 of FIG. 12, hysteresis is employed to effectively adjust the threshold voltage that causes the detection signal 1216 output by the system 1200 to switch between an object detected state and a no object detected state. The hysteresis circuit 1208 can be configured to react to large changes in a difference signal 1214 representing the difference between the measurement signal 1210 output by a measuring circuit 1202 and a delayed version of the measurement signal 1210 provided as the output 1212 of the low pass filter 1204. The low pass filter 1204 may be configured to closely track drift in the measurement signal 1210 attributable to PVT variations. Some optimizations may be required to ensure that the system 1200 can respond quickly to the placement of objects near components of the resonant circuit. A filter constant for the low pass filter 1204 can be selected to detect changes in object placement within a reasonable time frame as defined by application requirements, and/or with reference to user response times. The detection hysteresis corresponding to the delta change threshold for the hysteresis circuit 1208 may be configured to define a reasonable change in the measurement signal 1210 that reliably triggers a change in the detection signal 1216 when an object is present.

The graph 1220 shows an example of the response of the system 1200 to temperature variance on the measurement signal 1210. Initially, the system 1200 and the passive pulse resonant circuit are operating during a period of stability 1222, when the measurement signal 1210 is not affected by significant drift. In the illustrated example, the measurement signal 1210 is at a constant low voltage level 1226 when no object is placed near the resonant circuit. The output of the output 1212 of the low pass filter 1204 may be at or near the voltage level of the measurement signal 1210. In some instances, the output of the output 1212 of the low pass filter 1204 may be rising or falling toward the low voltage level 1226 if recent variations have occurred on the measurement signal 1210.

The measurement signal 1210 rises to a higher voltage level 1230 when an object is placed near a component of the resonant circuit, and the output 1212 of the low pass filter 1204 follows the measurement signal 1210. The low pass filter 1204 blocks higher frequency components of the measurement signal 1210, causing a slower rise of the output 1212 of the low pass filter 1204 than the rise observed in the measurement signal 1210. The difference between the levels of the measurement signal 1210 and the output 1212 of the low pass filter 1204 increases quickly and at some point in time 1228, exceeds the positive switching threshold 1238 for the hysteresis circuit 1208. The detection signal 1216 switches indicating that the system 1200 is in an object detected state 1232. The output of the low pass filter 1204 continues towards the higher voltage level of the measurement signal 1210.

The object is then removed and the measurement signal 1210 falls rapidly toward the low voltage level 1226. The output 1212 of the low pass filter 1204 follows the measurement signal 1210. The low pass filter 1204 blocks higher frequency components of the measurement signal 1210, causing a slower fall of the output 1212 of the low pass filter 1204 than the fall observed in the measurement signal 1210. The difference between the levels of the measurement signal 1210 and the output 1212 of the low pass filter 1204 increases quickly and at a point in time 1234 exceeds the negative switching threshold for the hysteresis circuit 1208. The output of the low pass filter 1204 continues towards the lower voltage level of the measurement signal 1210. In this example, the comparator output switches to an object detected state after the object is placed near a component of the resonant circuit and to an object not detected state when the object is removed.

A period of drift 1224 commences at a third point in time 1236. The drift may be caused by an increase in temperature, for example. The drift may cause an increase from the low voltage level 1226 when no object is placed near the resonant circuit. The output 1212 of the low pass filter 1204 converges on the drifting measurement signal 1210. In the illustrated example, the output 1212 of the low pass filter 1204 is falling when the measurement signal 1210 begins to rise due to drift. The levels of the measurement signal 1210 and the output 1212 of the low pass filter 1204 may coincide at a point in time 1240. The output 1212 of the low pass filter 1204 ceases falling and begins to rise, following the measurement signal 1210 and enabling reliable indication of object detection in the detection signal 1216.

In some implementations, the detection signal 1216 may be switched when a difference is observed between the measurement signal 1210 and the output 1212 of the low pass filter 1204 for a period of time exceeds a threshold minimum time interval. The use of a time interval to judge presence of an object may accommodate lower difference voltages between the measurement signal 1210 and the output 1212 of the low pass filter 1204, and may enable the system 1200 to respond more rapidly through a filter constant that reduces the delay introduced by the low pass filter 1204.

The adaptive passive ping thresholding techniques disclosed herein can be used to remove or ameliorate the effects of system drift or offsets, regardless of their origin. The adaptive passive ping techniques disclosed herein operate on the system transfer function directly, such that the mechanisms by which drift is caused do not need to be known or understood.

Figure 13:
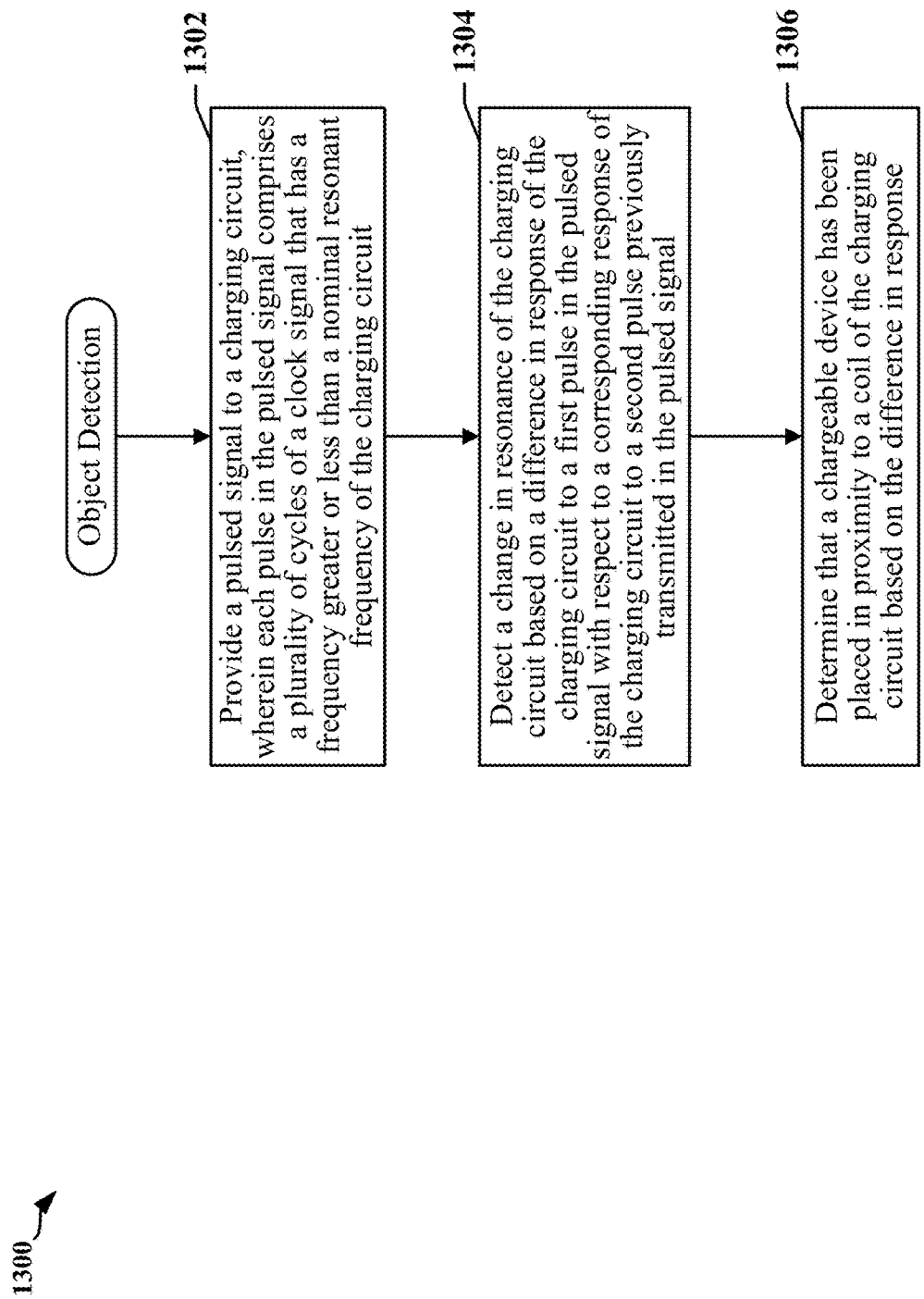
FIG. 13 is flowchart illustrating an example of a method for detecting an object in accordance with certain aspects disclosed herein.

FIG. 13 is a flowchart 1300 for a method for detecting objects near a surface of a charging device. In some implementations, the method may be managed or performed by a controller in the charging device. At block 1302, the controller may provide a pulsed signal to a charging circuit. Each pulse in the pulsed signal may include a plurality of cycles of a clock signal that has a frequency greater or less than a nominal resonant frequency of the charging circuit. In some instances, a pulse may include an integer number of cycles of a clock signal. In some instances, a pulse may an integer number of cycles of a clock signal and a fraction of a clock signal. The number of clock cycles in a pulse may be determined by a timer that controls the duration of the pulse.

At block 1304, the controller may detect a change in resonance of the charging circuit based on a difference in response of the charging circuit to a first pulse in the pulsed signal with respect to a corresponding response of the charging circuit to a second pulse previously transmitted in the pulsed signal. At block 1306, the controller may determine that a chargeable device has been placed in proximity to a coil of the charging circuit based on the difference in response.

In one example, the difference in response includes an increase in current flowing in the charging circuit in response to the second pulse with respect to current flowing in the charging circuit in response to the first pulse. In another example, the difference in response includes an increase in voltage across the coil of the charging circuit.

In some implementations, the controller may determine a charging configuration for the chargeable device when the coil of the charging circuit is inductively coupled to a receiving coil in the chargeable device, and provide a charging current to the charging circuit in accordance with the charging configuration. In some implementations, the controller may transmit an active ping in accordance with standards-defined specifications for charging the chargeable device, and identify the chargeable device from information encoded in a modulated signal received from the chargeable device.

In certain implementations, the change in resonance of the charging circuit includes a decrease in Q factor of the charging circuit. The controller may receive a measurement signal representative of the Q factor of the charging circuit, filter the measurement signal to obtain a filtered version of the measurement signal that changes at a slower rate than the measurement signal, and generate a detection signal that switches when a difference between the measurement signal and the filtered version of the measurement signal exceeds a threshold level. The controller may compare the measurement signal and the filtered version of the measurement signal using a comparator that comprises a hysteresis circuit configured to suppress response to slow changes in the measurement signal, including changes in the measurement signal caused by variations in operating voltage or temperature. Filtering the measurement signal may include using a FIR filter to filter the measurement signal or using a low pass filter to filter the measurement signal. The comparison logic may be a hysteresis comparator and/or may have a hysteresis circuit configured to suppress response to slow changes in the measurement signal and/or to suppress response to low-voltage changes in the measurement signal caused by variations in a voltage or a temperature associated with the apparatus.

Example of a Processing Circuit

Figure 14:
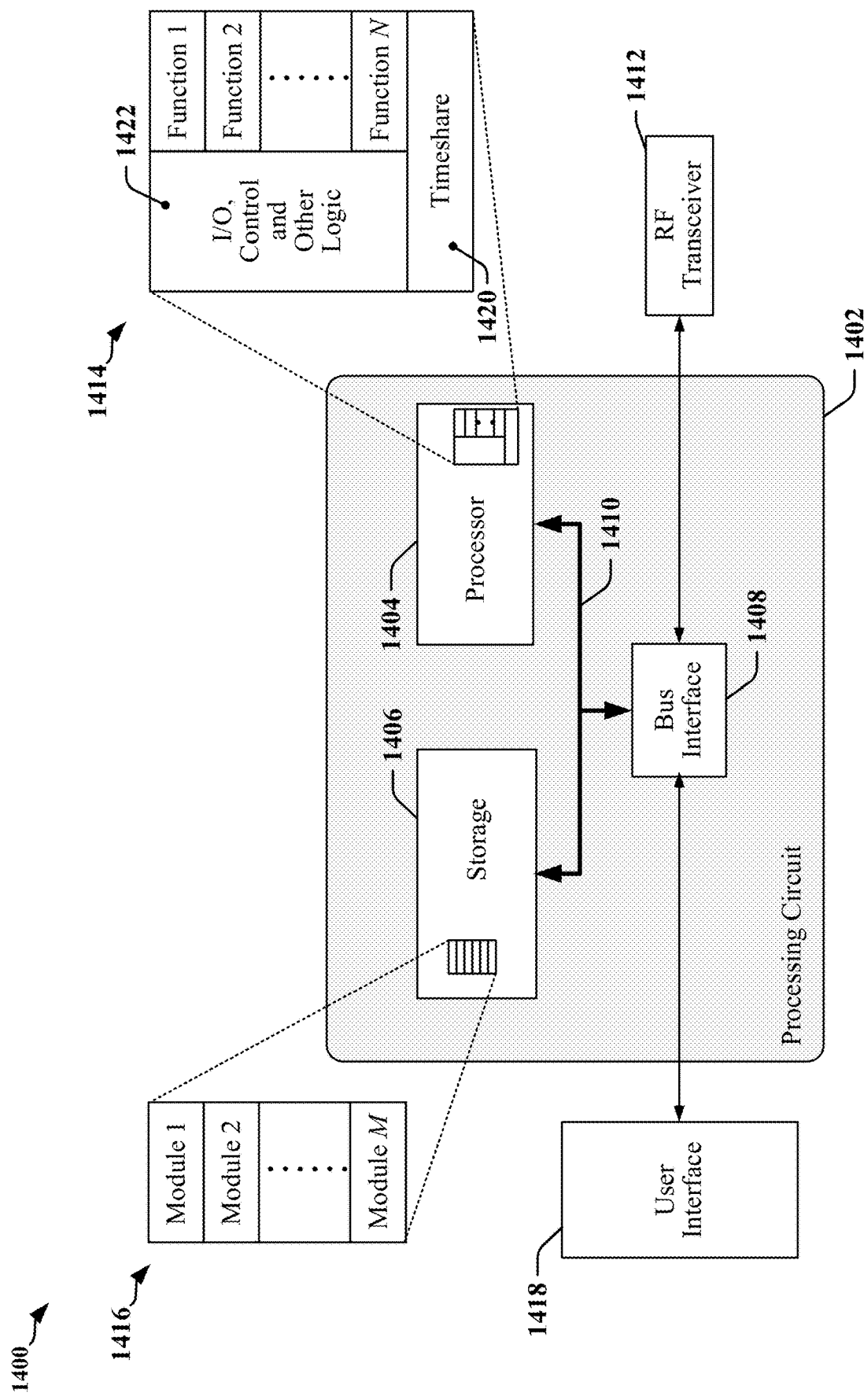
FIG. 14 illustrates one example of an apparatus employing a processing circuit that may be adapted according to certain aspects disclosed herein.

FIG. 14 is a diagram illustrating an example of a hardware implementation for an apparatus 1400 that may be incorporated in a charging device or in a receiving device that enables a battery to be wirelessly charged. In some examples, the apparatus 1400 may perform one or more functions disclosed herein. In accordance with various aspects of the disclosure, an element, or any portion of an element, or any combination of elements as disclosed herein may be implemented using a processing circuit 1402. The processing circuit 1402 may include one or more processors 1404 that are controlled by some combination of hardware and software modules. Examples of processors 1404 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1404 may include specialized processors that perform specific functions, and that may be configured, augmented or controlled by one of the software modules 1416. The one or more processors 1404 may be configured through a combination of software modules 1416 loaded during initialization, and further configured by loading or unloading one or more software modules 1416 during operation.

In the illustrated example, the processing circuit 1402 may be implemented with a bus architecture, represented generally by the bus 1410. The bus 1410 may include any number of interconnecting buses and bridges depending on the specific application of the processing circuit 1402 and the overall design constraints. The bus 1410 links together various circuits including the one or more processors 1404, and storage 1406. Storage 1406 may include memory devices and mass storage devices, and may be referred to herein as computer-readable media and/or processor-readable media. The storage 1406 may include transitory storage media and/or non-transitory storage media.

The bus 1410 may also link various other circuits such as timing sources, timers, peripherals, voltage regulators, and power management circuits. A bus interface 1408 may provide an interface between the bus 1410 and one or more transceivers 1412. In one example, a transceiver 1412 may be provided to enable the apparatus 1400 to communicate with a charging or receiving device in accordance with a standards-defined protocol. Depending upon the nature of the apparatus 1400, a user interface 1418 (e.g., keypad, display, speaker, microphone, joystick) may also be provided, and may be communicatively coupled to the bus 1410 directly or through the bus interface 1408.

A processor 1404 may be responsible for managing the bus 1410 and for general processing that may include the execution of software stored in a computer-readable medium that may include the storage 1406. In this respect, the processing circuit 1402, including the processor 1404, may be used to implement any of the methods, functions and techniques disclosed herein. The storage 1406 may be used for storing data that is manipulated by the processor 1404 when executing software, and the software may be configured to implement any one of the methods disclosed herein.

One or more processors 1404 in the processing circuit 1402 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1406 or in an external computer-readable medium. The external computer-readable medium and/or storage 1406 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1406 may also include, by way of example, a carrier wave, a transmission line, and any other suitable medium for transmitting software and/or instructions that may be accessed and read by a computer.

Computer-readable medium and/or the storage 1406 may reside in the processing circuit 1402, in the processor 1404, external to the processing circuit 1402, or be distributed across multiple entities including the processing circuit 1402. The computer-readable medium and/or storage 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1406 may maintain software maintained and/or organized in loadable code segments, modules, applications, programs, etc., which may be referred to herein as software modules 1416. Each of the software modules 1416 may include instructions and data that, when installed or loaded on the processing circuit 1402 and executed by the one or more processors 1404, contribute to a run-time image 1414 that controls the operation of the one or more processors 1404. When executed, certain instructions may cause the processing circuit 1402 to perform functions in accordance with certain methods, algorithms and processes described herein.

Some of the software modules 1416 may be loaded during initialization of the processing circuit 1402, and these software modules 1416 may configure the processing circuit 1402 to enable performance of the various functions disclosed herein. For example, some software modules 1416 may configure internal devices and/or logic circuits 1422 of the processor 1404, and may manage access to external devices such as a transceiver 1412, the bus interface 1408, the user interface 1418, timers, mathematical coprocessors, and so on. The software modules 1416 may include a control program and/or an operating system that interacts with interrupt handlers and device drivers, and that controls access to various resources provided by the processing circuit 1402. The resources may include memory, processing time, access to a transceiver 1412, the user interface 1418, and so on.

One or more processors 1404 of the processing circuit 1402 may be multifunctional, whereby some of the software modules 1416 are loaded and configured to perform different functions or different instances of the same function. The one or more processors 1404 may additionally be adapted to manage background tasks initiated in response to inputs from the user interface 1418, the transceiver 1412, and device drivers, for example. To support the performance of multiple functions, the one or more processors 1404 may be configured to provide a multitasking environment, whereby each of a plurality of functions is implemented as a set of tasks serviced by the one or more processors 1404 as needed or desired. In one example, the multitasking environment may be implemented using a timesharing program 1420 that passes control of a processor 1404 between different tasks, whereby each task returns control of the one or more processors 1404 to the timesharing program 1420 upon completion of any outstanding operations and/or in response to an input such as an interrupt. When a task has control of the one or more processors 1404, the processing circuit is effectively specialized for the purposes addressed by the function associated with the controlling task. The timesharing program 1420 may include an operating system, a main loop that transfers control on a round-robin basis, a function that allocates control of the one or more processors 1404 in accordance with a prioritization of the functions, and/or an interrupt driven main loop that responds to external events by providing control of the one or more processors 1404 to a handling function.

In one implementation, the apparatus 1400 may be implemented in a wireless charging device that has a battery charging power source coupled to a charging circuit, a plurality of charging cells and a controller, which may include the one or more processors 1404. The plurality of charging cells may be configured to provide a current to one or more charging coils near a surface of the charging device. At least one coil may be configured to direct an electromagnetic field through a charge transfer area of each charging cell.

The apparatus 1400 may include a pulse generating circuit configured to provide a pulsed signal to the charging circuit. Each pulse in the pulsed signal may include a plurality of cycles of a clock signal that has a frequency greater or less than a nominal resonant frequency of the charging circuit. In one example, the pulse generating circuit includes a logic circuit that gates a clock signal under the control of a timer. The controller may be configured to detect a change in resonance of the charging circuit based on a difference in response of the charging circuit to a first pulse in the pulsed signal with respect to a corresponding response of the charging circuit to a second pulse previously transmitted in the pulsed signal. The controller may be configured to determine that a chargeable device has been placed in proximity to the charging coil based on the difference in response. In one example, the difference in response includes an increase in current flowing in the charging circuit in response to the second pulse with respect to current flowing in the charging circuit in response to the first pulse. In another example, the difference in response includes an increase in voltage across the coil of the charging circuit.

In some implementations, the controller can be configured to determine a charging configuration for the chargeable device when the coil of the charging circuit is inductively coupled to a receiving coil in the chargeable device, and cause the charging circuit to provide a charging current to the charging circuit in accordance with the charging configuration. In one example, the controller can be configured to cause the charging circuit to transmit an active ping in accordance with standards-defined specifications for charging the chargeable device, and identify the chargeable device from information encoded in a modulated signal received from the chargeable device.

In certain implementations, the apparatus 1400 has a measurement circuit configured to provide a measurement signal representative of the resonance of the charging circuit based on the response of the charging circuit to the pulsed signal. In some examples, a change in resonance of the charging circuit includes a decrease in Q factor of the charging circuit. The apparatus 1400 may include a filter configured to provide a filtered version of the measurement signal that changes at a slower rate than the measurement signal, and comparison logic configured to generate a detection signal that switches when a difference between the measurement signal and the filtered version of the measurement signal exceeds a threshold level. The detection signal may indicate whether an object is positioned proximate to the charging coil. The filter may be implemented as a finite impulse response filter or a low pass filter. The comparison logic may include a hysteresis circuit configured to suppress response to low-voltage changes in the measurement signal caused by variations in a voltage or a temperature associated with the apparatus.

In some implementations, the storage 1406 maintains instructions and information where the instructions are configured to cause the one or more processors 1404 to provide a pulsed signal to a charging circuit, wherein each pulse in the pulsed signal comprises a plurality of cycles of a clock signal that has a frequency greater or less than a nominal resonant frequency of the charging circuit, detect a change in resonance of the charging circuit based on a difference in response of the charging circuit to a first pulse in the pulsed signal with respect to a corresponding response of the charging circuit to a second pulse previously transmitted in the pulsed signal, and determine that a chargeable device has been placed in proximity to a coil of the charging circuit based on the difference in response. The difference in response includes an increase in voltage across the coil of the charging circuit or an increase in current flowing in the charging circuit in response to the second pulse with respect to current flowing in the charging circuit in response to the first pulse.

In some implementations, the instructions may be configured to cause the one or more processors 1404 to determine a charging configuration for the chargeable device when the coil of the charging circuit is inductively coupled to a receiving coil in the chargeable device, and provide a charging current to the charging circuit in accordance with the charging configuration. In some implementations, the instructions may be configured to cause the one or more processors 1404 to transmit an active ping in accordance with standards-defined specifications for charging the chargeable device, and identify the chargeable device from information encoded in a modulated signal received from the chargeable device.

In certain implementations, the change in resonance of the charging circuit includes a decrease in Q factor of the charging circuit. The instructions may be configured to cause the one or more processors 1404 to receive a measurement signal representative of the Q factor of the charging circuit, filter the measurement signal to obtain a filtered version of the measurement signal that changes at a slower rate than the measurement signal, and generate a detection signal that switches when a difference between the measurement signal and the filtered version of the measurement signal exceeds a threshold level. The instructions may be configured to cause the one or more processors 1404 to compare the measurement signal and the filtered version of the measurement signal using a comparator that comprises a hysteresis circuit configured to suppress response to slow changes in the measurement signal, including changes in the measurement signal caused by variations in operating voltage or temperature. Filtering the measurement signal may include using a FIR filter to filter the measurement signal or using a low pass filter to filter the measurement signal. The comparison logic may be a hysteresis comparator and/or may have a hysteresis circuit configured to suppress response to slow changes in the measurement signal and/or to suppress response to low-voltage changes in the measurement signal caused by variations in a voltage or a temperature associated with the apparatus.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for detecting an object, comprising:
    transmitting a pulsed signal using a resonant circuit in a wireless charging device, wherein each pulse in the pulsed signal comprises a plurality of cycles of a clock signal that has a frequency that is greater than a nominal resonant frequency of the resonant circuit;
    for each pulse in the pulsed signal:
        generating a measurement signal representative of quality factor (Q factor) of the resonant circuit during transmission of the each pulse; and
        filtering the measurement signal to obtain a filtered measurement signal indicative of Q factor of the resonant circuit during transmission of the each pulse; and
    determining that a chargeable device has been placed in proximity to a coil of the resonant circuit when a first Q factor of the resonant circuit is different from a second Q factor of the resonant circuit, wherein the first Q factor is measured during transmission of a first pulse and the second Q factor is measured during transmission of a previously-transmitted second pulse.

2. The method of claim 1, wherein the first Q factor exceeds a threshold value when the chargeable device has been placed in proximity to the coil of the resonant circuit.

3. The method of claim 2, wherein the second Q factor is less than the threshold value before the chargeable device has been placed in proximity to the coil of the resonant circuit.

4. The method of claim 1, further comprising:
    detecting a change in the measurement signal between transmission of the first pulse and transmission of the second pulse; and
    determining that the chargeable device has been placed in proximity to the coil of the resonant circuit when the change in the measurement signal exceeds a threshold difference value.

5. The method of claim 1, further comprising:
    providing a low-pass filtered version of the measurement signal and a filtered version of the measurement signal to respective inputs of a comparator; and
    determining that the chargeable device has been placed in proximity to the coil of the resonant circuit when the comparator indicates a difference between its inputs.

6. The method of claim 5, wherein the low-pass filtered version of the measurement signal is obtained from a low-pass filter configured to block higher frequency components of the measurement signal.

7. The method of claim 5, wherein the comparator comprises a hysteresis circuit.

8. The method of claim 1, wherein the measurement signal is obtained by measuring current in the resonant circuit.

9. The method of claim 1, wherein the measurement signal is obtained by measuring voltage in the resonant circuit.

10. The method of claim 1, further comprising:
using the resonant circuit to transmit an active ping in accordance with standards-defined specifications for charging the chargeable device; and
identifying the chargeable device from information encoded in a modulated signal received from the chargeable device,
wherein the clock signal has a frequency that is greater than nominal resonant frequency defined by the standards-defined specifications.

11. A charging device, comprising:
a resonant circuit that includes a charging coil located proximate to a surface of the charging device;
a pulse generating circuit configured to provide a pulsed signal to the resonant circuit, wherein each pulse in the pulsed signal comprises a plurality of cycles of a clock signal that has a frequency that is greater than a nominal resonant frequency of the resonant circuit;
a measurement circuit configured to provide a measurement signal indicative of Q factor of the resonant circuit during transmission of each pulse in the pulsed signal;
a filter configured to provide a filtered measurement signal indicative of Q factor of the resonant circuit during transmission of the each pulse;
comparison logic configured to compare a first Q factor measured during transmission of a first pulse and a second Q factor is measured during transmission of a previously-transmitted second pulse; and
a controller configured to determine that a chargeable device has been placed in proximity to a coil of the resonant circuit when the first Q factor of the resonant circuit is different from the second Q factor of the resonant circuit.

12. The charging device of claim 11, wherein the first Q factor exceeds a threshold value when the chargeable device has been placed in proximity to the coil of the resonant circuit.

13. The charging device of claim 12, wherein the second Q factor is less than the threshold value before the chargeable device has been placed in proximity to the coil of the resonant circuit.

14. The charging device of claim 11, wherein the controller is further configured to:
detect a change in the measurement signal between transmission of the first pulse and transmission of the second pulse; and
determine that the chargeable device has been placed in proximity to the coil of the resonant circuit when the change in the measurement signal exceeds a threshold difference value.

15. The charging device of claim 11, wherein the comparison logic is further configured to:
determine that the chargeable device has been placed in proximity to the coil of the resonant circuit based on a comparison of provide a low-pass filtered version of the measurement signal with a filtered version of the measurement signal.

16. The charging device of claim 15, further comprising:
a low-pass filter configured to provide the low-pass filtered version of the measurement signal by blocking higher frequency components of the measurement signal.

17. The charging device of claim 15, wherein the comparison logic comprises a hysteresis circuit.

18. The charging device of claim 11, wherein the measurement signal is obtained by measuring current in the resonant circuit.

19. The charging device of claim 11, wherein the measurement signal is obtained by measuring voltage in the resonant circuit.

20. The charging device of claim 11, wherein the controller is further configured to:
use the resonant circuit to transmit an active ping in accordance with standards-defined specifications for charging the chargeable device; and
identify the chargeable device from information encoded in a modulated signal received from the chargeable device,
wherein the clock signal has a frequency that is greater than nominal resonant frequency defined by the standards-defined specifications.

* * * * *